(12) United States Patent
Wilkinson et al.

(10) Patent No.: US 12,360,749 B2
(45) Date of Patent: Jul. 15, 2025

(54) STREAMING DATA TO MULTI-TILE PROCESSING SYSTEM

(71) Applicant: Microsoft Technology Licensing, LLC, Redmond, WA (US)

(72) Inventors: Daniel John Pelham Wilkinson, Bristol (GB); Richard Osborne, Bristol (GB); Graham Bernard Cunningham, Wiltshire (GB); Kenneth Gordon, London (GB); Samuel Alexander Webster, Cambridge (GB); Stavros Volos, Cambridge (GB); Kapil Vaswani, Karnataka (IN); Balaji Vembu, Redmond, WA (US); Cédric Alain Marie Fournet, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 18/005,246

(22) PCT Filed: Jul. 13, 2021

(86) PCT No.: PCT/US2021/041502
§ 371 (c)(1),
(2) Date: Jan. 12, 2023

(87) PCT Pub. No.: WO2022/015775
PCT Pub. Date: Jan. 20, 2022

(65) Prior Publication Data
US 2023/0342121 A1    Oct. 26, 2023

(30) Foreign Application Priority Data

Jul. 14, 2020 (GB) ...................................... 2010816
Jul. 14, 2020 (GB) ...................................... 2010823

(51) Int. Cl.
*G06F 8/41* (2018.01)

(52) U.S. Cl.
CPC ...................................... *G06F 8/41* (2013.01)

(58) Field of Classification Search
None
See application file for complete search history.

(56) References Cited

U.S. PATENT DOCUMENTS

| 8,738,860 B1 * | 5/2014 | Griffin | ................ G06F 12/0897 711/122 |
| 10,747,712 B1 * | 8/2020 | Agarwal | ........... G06F 15/17381 |

(Continued)

OTHER PUBLICATIONS

"International Search Report and Written Opinion Issued in PCT Application No. PCT/US2021/041502", Mailed Date: Dec. 13, 2021, 20 Pages.

(Continued)

*Primary Examiner* — Ryan D. Coyer
(74) *Attorney, Agent, or Firm* — Barta Jones, PLLC

(57) ABSTRACT

A processing system comprising one or more chips, each comprising a plurality of tiles is described. Each tile comprises a respective processing unit and memory, the memory storing a codelet. The processing system has at least one encryption unit configured to encrypt and decrypt data transferred between the tiles and a trusted computing entity via an external computing device. The codelets are configured to instruct the tiles to transfer the encrypted data by reading from and writing to a plurality of memory regions at the external memory such that a plurality of streams of encrypted data are formed, each stream using an individual one of the memory regions at the external computing device.

19 Claims, 23 Drawing Sheets

(56) References Cited

U.S. PATENT DOCUMENTS

| | | | |
|---|---|---|---|
| 11,321,272 B2* | 5/2022 | Knowles | G06F 15/17312 |
| 11,582,021 B1* | 2/2023 | Wesselkamper | G11C 17/16 |
| 2007/0157012 A1* | 7/2007 | Chen | G06F 21/77 |
| | | | 713/1 |
| 2011/0271161 A1* | 11/2011 | Kursun | G06F 11/3089 |
| | | | 714/736 |
| 2015/0201034 A1 | 7/2015 | Hellyar et al. | |
| 2015/0261535 A1* | 9/2015 | Snyder, II | G06F 9/3881 |
| | | | 712/34 |
| 2016/0062921 A1* | 3/2016 | Kim | H04L 9/3242 |
| | | | 713/193 |
| 2016/0171249 A1* | 6/2016 | Circello | G06F 21/72 |
| | | | 713/189 |
| 2016/0301669 A1* | 10/2016 | Muma | H04L 63/0428 |
| 2019/0281025 A1 | 9/2019 | Harriman et al. | |
| 2020/0104208 A1* | 4/2020 | Heo | G06F 3/0619 |
| 2020/0183738 A1* | 6/2020 | Champigny | G06F 9/5016 |
| 2020/0280528 A1* | 9/2020 | Wang | H04L 47/6275 |
| 2021/0390211 A1* | 12/2021 | Brook | H04L 9/0891 |
| 2022/0019700 A1* | 1/2022 | Wilkinson | G06F 21/6218 |

OTHER PUBLICATIONS

"Invitation to Pay Additional Fee Issued in PCT Application No. PCT/US21/041502", Mailed Date: Oct. 20, 2021, 17 Pages.

* cited by examiner

ID
STREAMING DATA TO MULTI-TILE PROCESSING SYSTEM

BACKGROUND

Multi-tile processing systems are increasingly used to facilitate parallel computing for applications such as machine learning where vast amounts of data is to be processed. Multi-tile processing systems are deployed in data centres and elsewhere to improve efficiency of various types of algorithm by allowing greater concurrency.

Increasingly there is a desire to work with sensitive code and or sensitive data and to retain security and privacy. Often large amounts of sensitive code and or data are to be processed using resource intensive algorithms and multi-tile processing systems are an option to improve efficiency in such situations. However, where multi-tile processing systems are used additional challenges are introduced regarding security and privacy of sensitive code and/or data since it is difficult to transfer data to and from the multi-tile processing system securely.

The embodiments described below are not limited to implementations which solve any or all of the disadvantages of known multi-tile processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a processing system comprising one or more chips, each comprising a plurality of tiles. Each tile comprises a respective processing unit and memory, the memory storing a codelet. The processing system has at least one encryption unit configured to encrypt and decrypt data transferred between the tiles and a trusted computing entity via an external memory. The codelets have been compiled by a compiler at the trusted computing entity to instruct the tiles to transfer the encrypted data by reading from and writing to a plurality of memory regions at the external memory such that a plurality of streams of encrypted data are formed, each stream using an individual one of the memory regions at the external memory.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
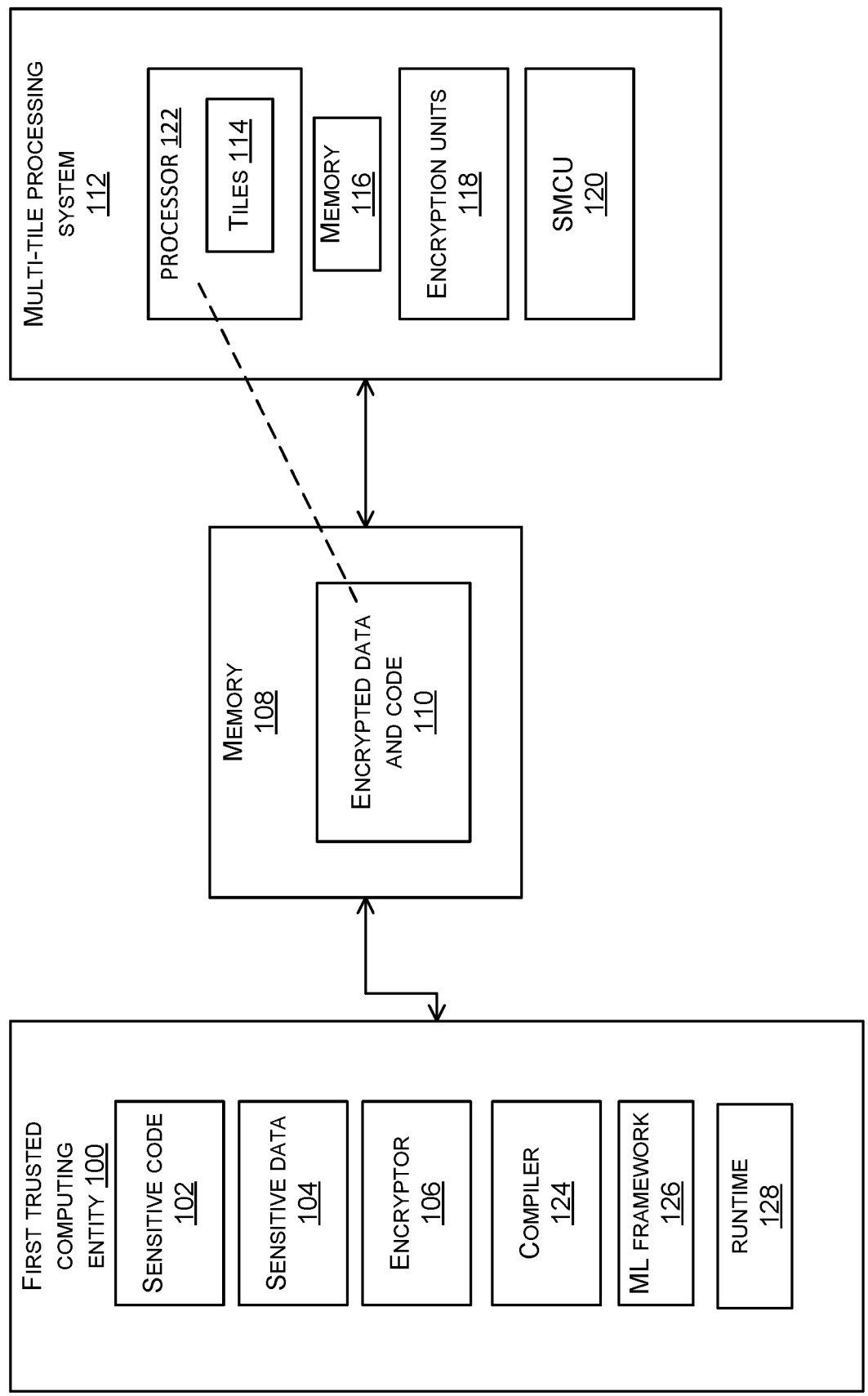
FIG. 1 is a schematic diagram of a first trusted computing entity, an untrusted intermediary, and a multi-tile processing system.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned in the background section, where multi-tile processing systems are used additional challenges are introduced regarding security and privacy of sensitive code and/or data since it is difficult to transfer data to and from the multi-tile processing system securely. To address these challenges the present disclosure teaches using streams to transfer data to and from a multi-tile processing system securely. The transferred data is code and/or other types of data. The inventors have added features to a multi-tile processor to facilitate the deployment of streams. A stream is a communication path for encrypted data between a tile of a multi-tile processing system and a memory external to the multi-tile processing system. The memory is at a host computing device in some examples where the multi-tile processing system is a peripheral device. The memory is any suitable memory external to the multi-tile processor chip. Because of the encryption used to keep the transferred data secure the streams have to be workable with an encryption protocol which is not straightforward.

Often a multi-tile processing system is used for processing vast numbers of data instances where each data instance is to be processed in a generally similar manner. It is found that streams are useful in such a scenario, to enable data instances to be streamed into the multi-tile processing system in a secure manner to particular ones of the tiles. However, problems arise where there is a failure at the multi-tile processing system part way through processing of the vast number of data instances. By using streams, the inventors have created a multi-tile processing system which is able to recover the work done before the failure and resume the processing of the data instances at an appropriate point in a stream of the data instances. The recovery is secure since the streams are secure which are used to implement the recovery. Embodiments are described below with reference to FIGS. 6 and 7 regarding the secure recovery process also referred to as secure checkpointing.

The shuffling operator is a useful operator in machine learning frameworks. Gradient descent algorithms, extensively used in training of machine learning models, are subject to get "stuck" in local minima while a better solution may lie nearby. Shuffling of the data instances (referred to collectively as a dataset) across training iterations (epochs) helps training algorithms to "bounce" out of a local minimum, thereby reducing training times and increasing training accuracy.

The use of shuffling makes deployment of streams extremely difficult. In particular, shuffling the dataset changes the sequence at which data instances are fetched by the tiles, and subsequently the order at which initialization vectors are to be authenticated. To address the problem the tile may be given access to the permutation of initialization vectors as constructed by the shuffling operator outside the multi-tile processor. However, reconstruction of the initialization vector permutation requires large memory capacity to hold the data instances that have been already consumed. This is prohibitive as memory is a scarce resource in the multi-tile processing system. Another option is to encrypt the shuffled dataset rather than the initial dataset. This solves the initialization vector sequence issue as the tiles sequentially fetch the dataset and the initialization vector sequences are static (known at compile time) and the same across all training iterations. However, this comes with prohibitive storage requirements in order to encrypt and store the same dataset as many times as the number of training iterations. The inventors have created a solution whereby a first stream is used in conjunction with a second stream, referred to as a permutation stream, such that shuffling is enabled together with the use of streams in an efficient and practical manner. Embodiments are described below with reference to FIGS. 8 and 9 regarding use of streams and shuffling.

In various examples described herein, a multi-tile processing system is used together with an external memory. The external memory is not trusted. A tenant has sensitive code to be executed on the multi-tile processing system in order to process the sensitive data. In some examples, one or more other tenants are also using the multi-tile processing system, but this is not essential. In an example the sensitive code is a neural network or other machine learning model and the sensitive data is training data. The machine learning model is trained on the multi-tile processing system and the resulting trained model parameters are returned to the tenant from the multi-tile processing system after training. However, the technology is not limited to machine learning applications and any sensitive code and sensitive data is used.

In order for the sensitive code to be executed on the multi-tile processing system it is to be transferred to the multi-tile processing system via the external memory. However, transferring sensitive code to the multi-tile processing system via the external memory is not straightforward since the external memory is not trusted. The sensitive data is also to be transferred to the multi-tile processing system and again, this is problematic where the external memory is potentially malicious.

In various examples, the tenant is a computing device referred to as a client and as the first trusted computing entity 100 in FIG. 1, which is in communication with the external memory over any suitable communications network. The multi-tile processing system is in communication with the external memory. A trusted execution environment (TEE) is formed on the multi-tile processing system for executing the sensitive code and processing the sensitive data. The state of the TEE and the genuity of the multi-tile processing system can be attested by a remote entity based on evidence generated and signed by the multi-tile processing system using a key that is rooted to a unique device secret available only at the multi-tile processing system.

FIG. 1 shows three high level entities: a first trusted computing entity 100, a memory 108 which is untrusted and a multi-tile processing system 112.

The first trusted computing entity 100 is controlled by a tenant in some examples and has access to sensitive code 102 and sensitive data 104 to be processed at the multi-tile processing system 112. The first trusted computing entity 100 has an encryptor 106 which encrypts the sensitive code 102 and sensitive data 104 before transfer to the multi-tile processing system 112 via memory 108. The first trusted computing entity 100 has a compiler 124 which is described in more detail with reference to FIG. 2 below, as well as a runtime 128 used by the compiler, and a machine learning framework 126. The machine learning framework 126 is software which communicates with the compiler 124 via an application programming interface of the compiler 124. The machine learning framework enables an application developer to build and/or deploy one or more machine learning models to be trained and/or executed using the multi-tile processing system 112 as part of the sensitive code 102. The machine learning framework enables an application developer to define software for doing one or more of: creating a stream, associating a stream with a key, indicating when a key is to be loaded at an encryption unit.

The memory 108 is any memory which is in communication with the first trusted computing entity 100 via a communications network or link, and which is in communication with the multi-tile processing system 112 via a communications network or link. The memory 110 stores at least encrypted code and/or data from the first trusted computing entity 100. In some examples the memory 100 is memory of a host computing device and the multi-tile processing system 112 is a peripheral device of the host computing device. However, it is not essential for the memory 110 to be at a host device. The memory is any memory external to the multi-tile processing system 112.

Examples of the multi-tile processing system 112 are described in detail below with reference to at least FIGS. 4 and 5. The multi-tile processing system 112 has at least one processor 122. The multi-tile processing system is able to create a trusted execution environment for processing sensitive data using sensitive code. The multi-tile processing system 112 has tiles 114 for processing sensitive data using sensitive code in a parallel manner. The tiles 114 are processors or other compute elements as described in detail below. The multi-tile processing system 112 has a memory 116 and it has one or more encryption units 118. Each encryption unit 118 is able to encrypt and to decrypt data. A secure microcontroller unit (SMCU) 120 of the multi-tile processing system 112 controls processes to create the trusted execution environment and various other functions.

The encryption unit(s) 118 at the multi-tile processing system 112 and the encryptor 106 at the first trusted computing entity are both configured to use an encryption protocol for encrypting blocks of sensitive code and/or data for transfer via the untrusted external memory 108. Any encryption protocol is usable which protects the sensitive information using keys and initialization vectors. An individual block is encrypted using a pair comprising an initialization vector and a key.

In some examples, the encryption protocol is one which is particularly efficient at managing initialization vectors of the encryption protocol. The encryption protocol involves the first and second trusted computing entities pre-agreeing a parameterized function for obtaining the initialization vectors in a very efficient manner.

More information about an example encryption protocol is now given to aid understanding of the technology.

The example encryption protocol is for encrypting code and data in software so that it can be decrypted by encryption units 118 on the multi-tile processing system while guaranteeing integrity and protecting against attacks, such as re-ordering, dropping, or replaying responses. Protecting against these attacks involves encryption using an initialization vector (IV). The IV stays protected from an attacker and the IV is not re-used to encrypt different data with the same key.

The example encryption protocol partitions the input and output data streams into equally-sized frames and associates each frame in each stream with a unique value called an Encrypted Virtual Address, or EVA. The EVA can be viewed as an extension of a peripheral component interconnect (PCI) tile address, which is a virtual address currently visible to the compiler 124. The code generated by the compiler 124 refers to frames in external memory 108 by one or more of the PCI tile address and the EVA. A frame also comprises the IV and an authentication tag such as in the beginning and end of the frame, respectively. The authentication tag is generated by the encryptor 106 or encryption units 118.

Frame authentication involves checking whether the tag generated at the end of the decryption matches an expected authentication tag. The latter is placed at the end of the frame. The code generated by the compiler (for issuing direct memory access DMA requests used to read or write to the external memory 108) accounts for the additional frame space used by the tag. For ingress streams, the code running on the device is responsible for stripping away the tag while for egress streams, it provisions space, which will be filled in by the encryption units 118 during encryption.

The EVA of a frame is used as an IV to the encryption/decryption of the frame. In particular, a data encryptor 106, 118 uses the EVA of the (input) frame as IV when encrypting the frame with an encryption key and never reuses the same EVA/IV to encrypt another frame with the same key. Enforcing this invariant guarantees that there is just one frame encrypted with the same IV and encryption key. The multi-tile processing system uses the EVA of an (output) frame as the IV while encrypting the frame before writing it to external memory 108. The protocol requires that the application running on the multi-tile processing system avoids reusing the same EVA/IV for writing two different frames.

Unlike conventional advanced encryption standard (AES) encryption where the IV is implicit (often derived from a counter) and private to the encryption engine, the IV in the example encryption protocol is explicit raising a question how is the IV made available to the encryption engine for encryption and decryption? The protocol involves that the IV is included in the frame's header and passed along with the data in cleartext. For ingress streams, the IV is placed in the header by the encryptor 106. For egress streams, the IV is placed in the header of the frame by the encryption units 118. Passing the IV in cleartext, however, creates an attack vector since an attacker can tamper with the IVs, enabling the attacker to re-order, re-play, or drop frames.

Data integrity in such an attack vector is preserved by the combination of checking the authenticity of input frames followed by a check to ensure that the IV included in a frame's header matches the EVA—i.e., expected IV. For input streams, while the multi-tile processing system's encryption units 118 authenticate the frame using the explicit IV and the authentication tag at the end of the frame, the running application (codelets described below) authenticates the IV to ensure that the IV in the header of the frame matches the expected IV. The application also strips away the IV before the frame is consumed. For egress streams, the decryption tool in possession of the key and the expected sequence of IVs, authenticates the frame using the expected IV of the frame and the authentication tag at the end of the frame.

The IV authentication involves that the entity consuming the data has knowledge of the expected IVs. For both input and output streams this requirement is satisfied by design as the protocol uses EVAs as IVs and EVAs are generated by the compiler and are available to the running application (i.e., encoded in code that consumes input frames and writes output frames) and encryption tools in the form of stream-level metadata.

A confidential data stream is usable to transfer a sequence of data instances encrypted according to an encryption protocol. Each data instance is partitioned into a sequence of frames and each frame is encrypted using a key of the stream and a 128-bit IV, constructed according to a format having a plurality of fields. The plurality of fields comprise: a stream type field which is used to indicate whether the stream carries data or is a permutation stream, a stream identifier field which carries a unique identifier associated with the stream, and an index field which carries an index of the frame within the stream. IVs do not contain any application-specific attributes, such as the batch size, memory region in the external memory associated with the stream, or the number of tiles that issue read or write requests to the stream. Such attributes are stored in an application manifest. This allows a data stream to be encrypted once and reused across applications as long the applications do not use two streams with the same key and stream identifier, The compiler 124 generates code as part of the processing tile's application (comprising codelets as described below), which generates a sequence of read and write requests to the tile PCI space (external memory 108) and the tile address space (tile-tile communication).

Figure 2:
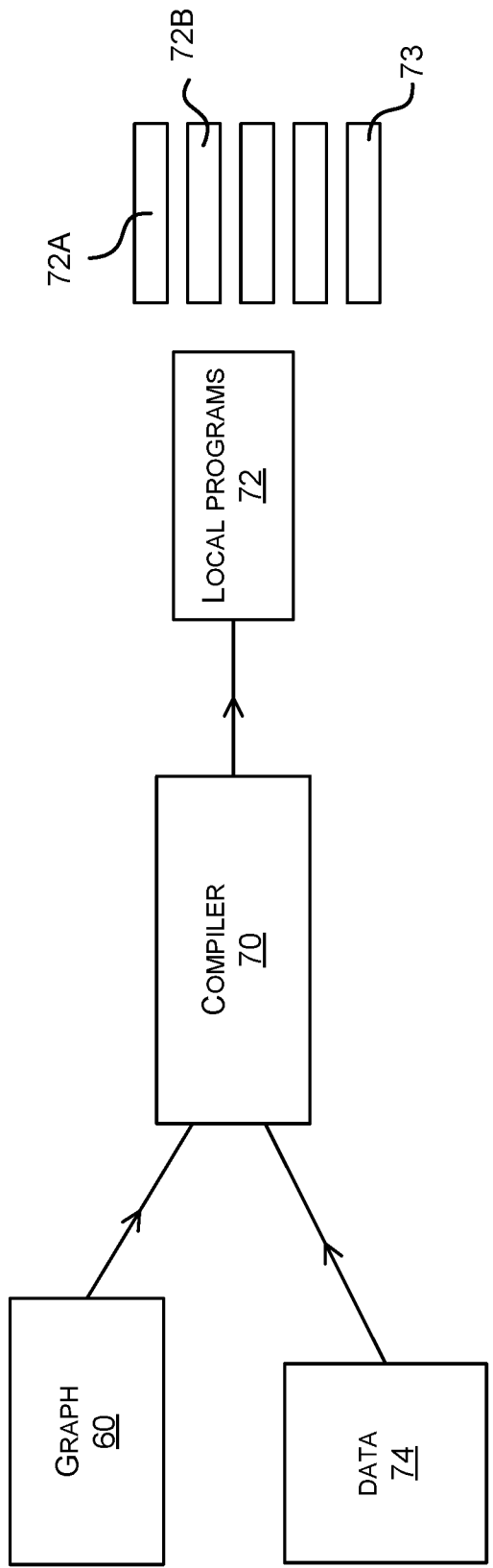
FIG. 2 is a schematic diagram of a compiler for generating codelets to deploy on a multi-tile processing system.

FIG. 2 is a schematic diagram of an example of compiler 124 of FIG. 1 in more detail. In FIG. 2 the compiler 70 is configured to receive a computation graph 60 of a machine learning model as well as tile data 74. The compiler 70 receives the computation graph 60 and tile data 74 as part of the sensitive code 102 at the first trusted computing entity 100. In an example, a tenant creates the sensitive code using the machine learning framework 126 to specify a machine learning model and training algorithms to be used. Computation graphs and how to create them are well known in the field of machine learning. Each node of the computation graph represents a function of its one or more inputs as received on its input edge or edges, with the result of this function being the output(s) provided on the output edge or edges. Each function is parameterized by one or more parameters sometimes referred to as weights. The compiler receives a computation graph 60 and compiles the functions in the nodes into a multiplicity of codelets, which are contained into local programs labelled 72 in FIG. 6. Each local program is designed to be loaded into a particular tile of the multi-tile processing system 112. Each local program comprises one or more codelets 72a, 72b, . . . plus a supervisor sub-program 73 each formed of a sequence of instructions.

The codelets 72a, 72b and supervisor sub-program 73 are loaded into the appropriate tiles of the multi-tile processing system in a secure manner such as by having the SMCU write bootstrapping code into the tiles such that the bootstrapping code is able to fetch the codelets in encrypted form.

The machine learning framework 126 provides input to the compiler (not shown in FIG. 2) in some cases as described in more detail below. In an example, the machine learning framework provides information to the compiler about points in execution of the codelets at which execution is temporarily halted until keys are reloaded into one or more encryption units of the multi-tile processing system 200. The machine learning framework 126 determines the points by identifying transitions in the sensitive code between regions of the sensitive code where a first set of keys is specified by the code to be used by the encryption units and regions of the sensitive code where a second set of keys is specified to be used by the encryption units, where the first set of keys is different from the second set of keys and where a set of keys comprises one or more key.

Figure 3:
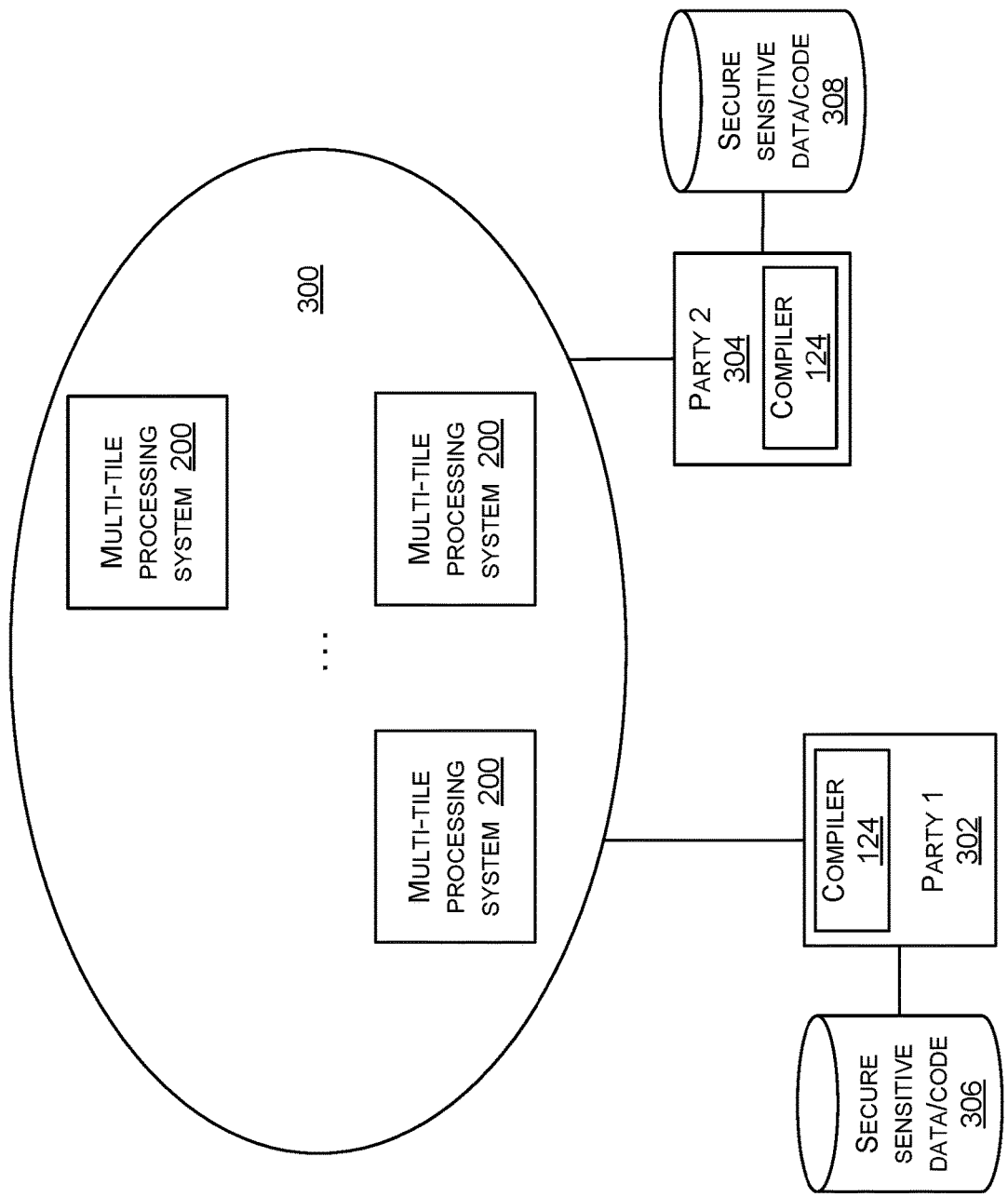
FIG. 3 is a schematic diagram of a data center comprising multi-tile processing systems.

In an example, a plurality of multi-tile processing systems 200 are deployed in a data center 300 as illustrated in FIG. 3 where the multi-tile processing systems 200 are interconnected using a communications network within the data center 300 which is not shown in FIG. 3 for clarity. A first tenant 302 comprising a computing device has a secure store 306 of sensitive data and/or code and a compiler 124. The first tenant 302 is in communication with the data center 300. The first tenant 302 is able to compile the sensitive code 306 using compiler 124 to generate codelets which are deployed on one or more of the multi-tile processing systems 200 in the data center 300. The first tenant 302 is able to transfer the sensitive data to the multi-tile processing systems using streams as described in more detail below, so that the sensitive data is processed in the multi-tile processing systems 200.

In some examples there is a second tenant 304 comprising a computing device in communication with the data center 300. The second tenant 304 has a secure store 308 of sensitive code and/or data. The second tenant is able to copy the sensitive code and data to one or more of the same multi-tile processing systems 200 in the data center as the first tenant 302. Using resource isolation mechanisms in the multi-tile processing systems 200 it is possible for the security of the individual tenants to be maintained.

FIG. 3 illustrates the situation for a data center. However, it is also possible to use the multi-tile processing systems of FIG. 1 in stand-alone situations or in other types of deployment.

Figure 4:
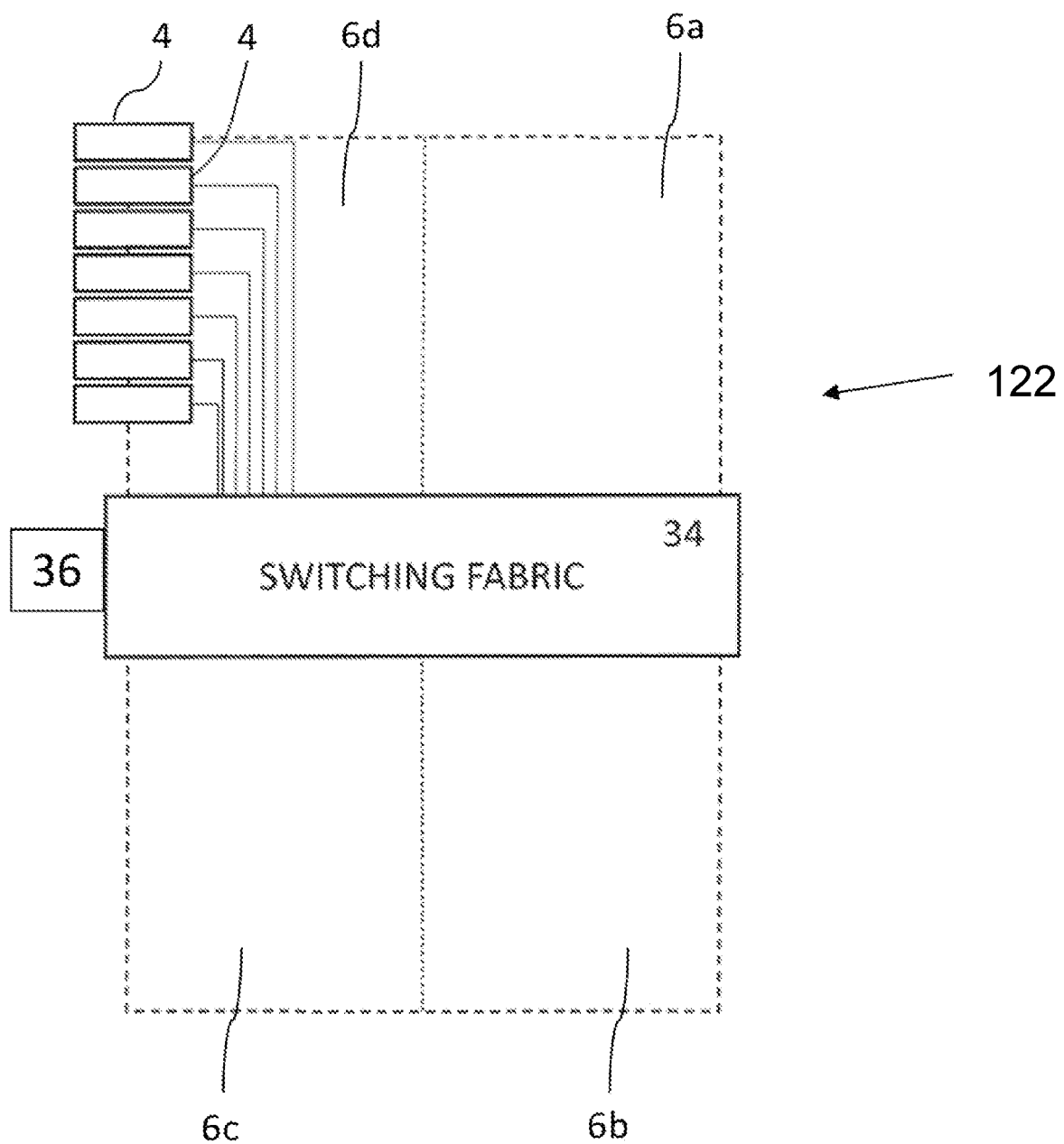
FIG. 4 is a schematic diagram of a multi-tile processing unit of a multi tile processing system.

FIG. 4 illustrates schematically the architecture of an example processor 122. The processor 122 comprises an array 6 of multiple processor tiles 114 and an interconnect 34 connecting between the tiles 114. The processor 122 is implemented alone or as one of multiple dies packaged in the same integrated circuit (IC) package. The interconnect 34 may also be referred to herein as the "exchange fabric" 34, as it enables the tiles 114 to exchange data with one another. Each tile 114 comprises a respective instance of an execution unit and memory. For instance, by way of illustration, the processor 122 may comprise of the order of hundreds of tiles 114, or even over a thousand. For completeness, note also that an "array" as referred to herein does not necessarily imply any particular number of dimensions or physical layout of the tiles 114. Each tile 114 has its own local memory. The tiles 114 do not share memory.

The processor 122 receives work from the first trusted computing entity 100 which is in communication with the processor 122 via memory 108 using one of a plurality of chip-to-host links implemented on an integrated circuit (i.e. chip) to which the processor 122 belongs. The work takes the form of input data to be processed by the processor 122. When providing the work, the memory 108 may access a computer, which comprises a single such processor 122 or a group of multiple processors 122, depending on the workload from the first trusted computing entity 100.

The processor 122 comprises a switching fabric 34 to which the tiles 114 and links are connected by sets of connection wires, the switching fabric 34 being stateless, i.e. having no program visible state. Each set of connection wires is fixed end to end. In this example, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. Each set of connection wires is pipelined and comprises a series of temporary stores, e.g. latches or flip flops, which hold datum for a clock cycle before releasing it to the next store. Time of travel along each wire is determined by these temporary stores, each one using up a clock cycle of time in a path between any two points. In this way, data exchange between tiles 114 may be conducted on a time deterministic basis.

By sending data between tiles 114 in a time deterministic manner, the "packets" may be sent without destination identifiers, which would permit an intended recipient to be uniquely identified. The packets may, however, include headers indicating at least one direction of travel through the switching fabric 34.

As mentioned above, the inventors have created a multi-tile processor which facilitates the deployment of streams. A stream is a communication path for encrypted data between a tile of a multi-tile processing system and a memory external to the multi-tile processing system. FIG. 5 illustrates a stream as a communication path indicated by the arrows. FIG. 5A and FIG. 5B also show streams. In FIG. 5 there is a multi-tile processing system 516 comprising a plurality of tiles 506, 514 (only two tiles are shown for clarity although in practice there may be many more tiles), an exchange block 504 and an encryption unit 502. Suppose that the stream is an ingress stream for reading sensitive data and/or sensitive code into the multi-tile processing system. The sensitive data and/or sensitive code has already been encrypted and stored in the memory 108 external to the multi-tile processing system by the first trusted computing entity 100 of FIG. 1. The first trusted computing entity divided the sensitive data and/or code into frames and encrypted it using keys and initialization vectors as described in more detail below. The encrypted frames are stored in a region 500 of the memory 108. Codelets 510 are created by the compiler at the first trusted computing entity 100 of FIG. 1 and deployed at one or more of the tiles such as tile 508 in FIG. 5. The codelets 510 are executed to cause data to be exchanged between their respective tile 4 and the memory 108. The codelet gives the tile 506 information about how to execute the stream illustrated in FIG. 5. FIG. 5 shows only one region 500 and only one stream for clarity although in practice there are many streams each having an associated region of memory in the external memory. Codelets are configured to instruct the tiles to transfer the encrypted data by reading from and writing to a plurality of memory regions at the external memory such that a plurality of streams of encrypted data are formed, each stream using an individual one of the memory regions at the external memory. Each stream uses one memory region which is not shared with other live streams. A live stream is able to use a memory region of a non-live stream in order to make efficient use of the memory available.

A tile 506 at an endpoint of a stream is referred to as an input/output tile (I/O tile). A stream can have more than one endpoint tile in which case a round robin or other allocation scheme is used to serve the endpoint tiles in turn.

An I/O tile is able to communicate with others of the tiles which are not I/O tiles using inter tile communication as described above with reference to FIG. 4 in order to obtain data to write to the region 500 or send data it has received from the region 500.

Figure 5:
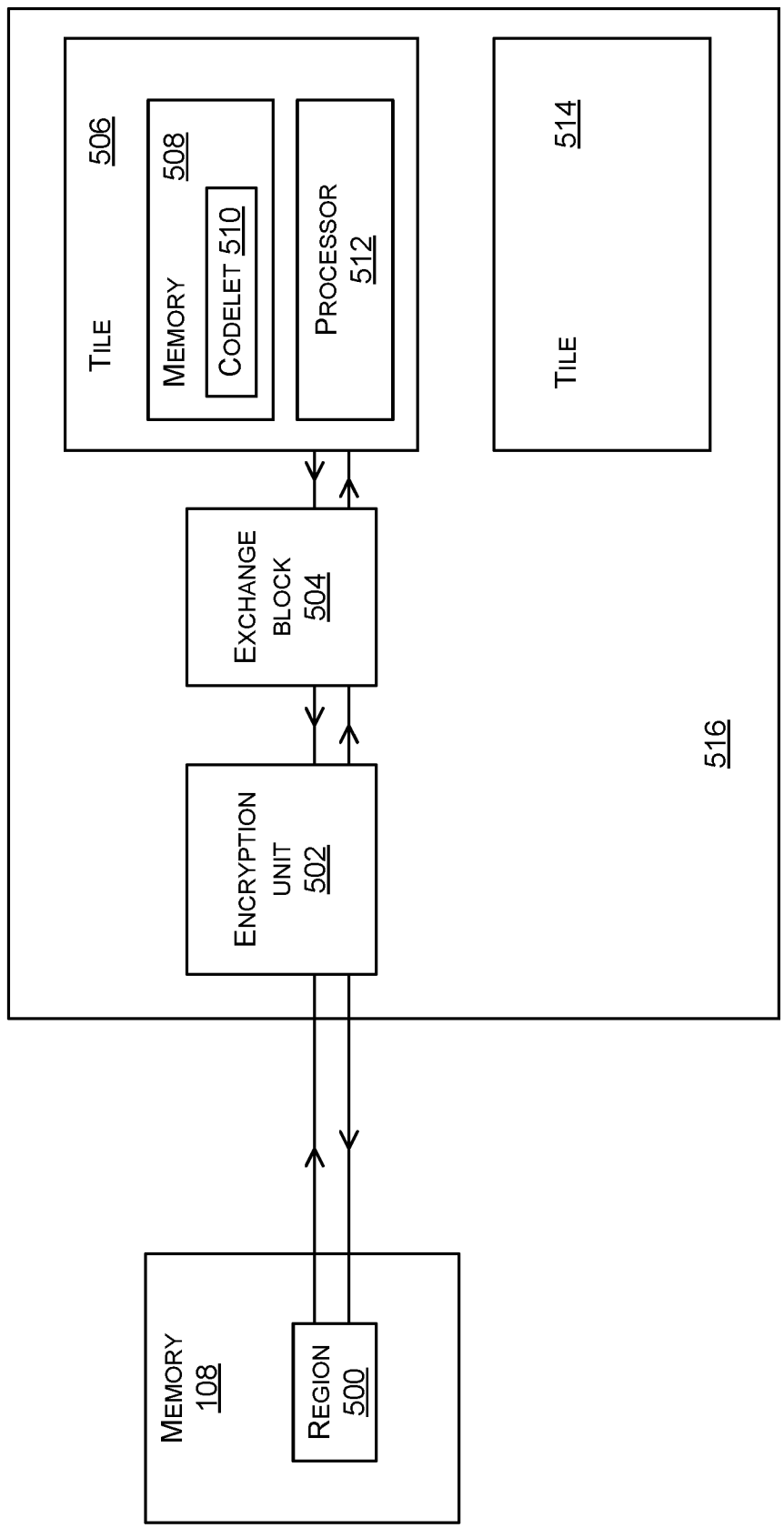
FIG. 5 is a schematic diagram of a multi-tile processing system used with an external memory.
Figure 5A:
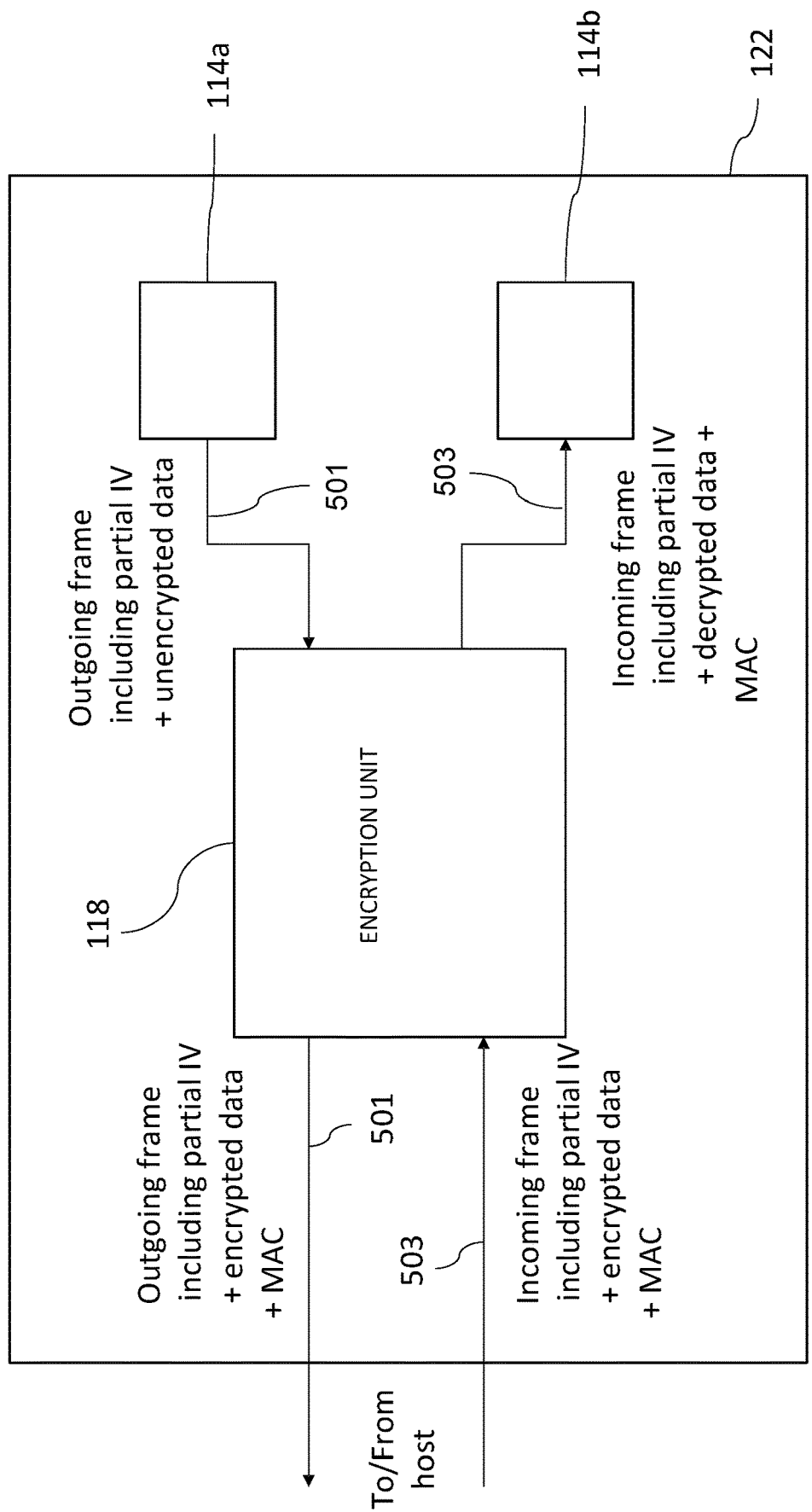
FIG. 5A is a diagram illustrating the movement of different data components to and from tiles and through the encryption hardware.
Figure 5B:
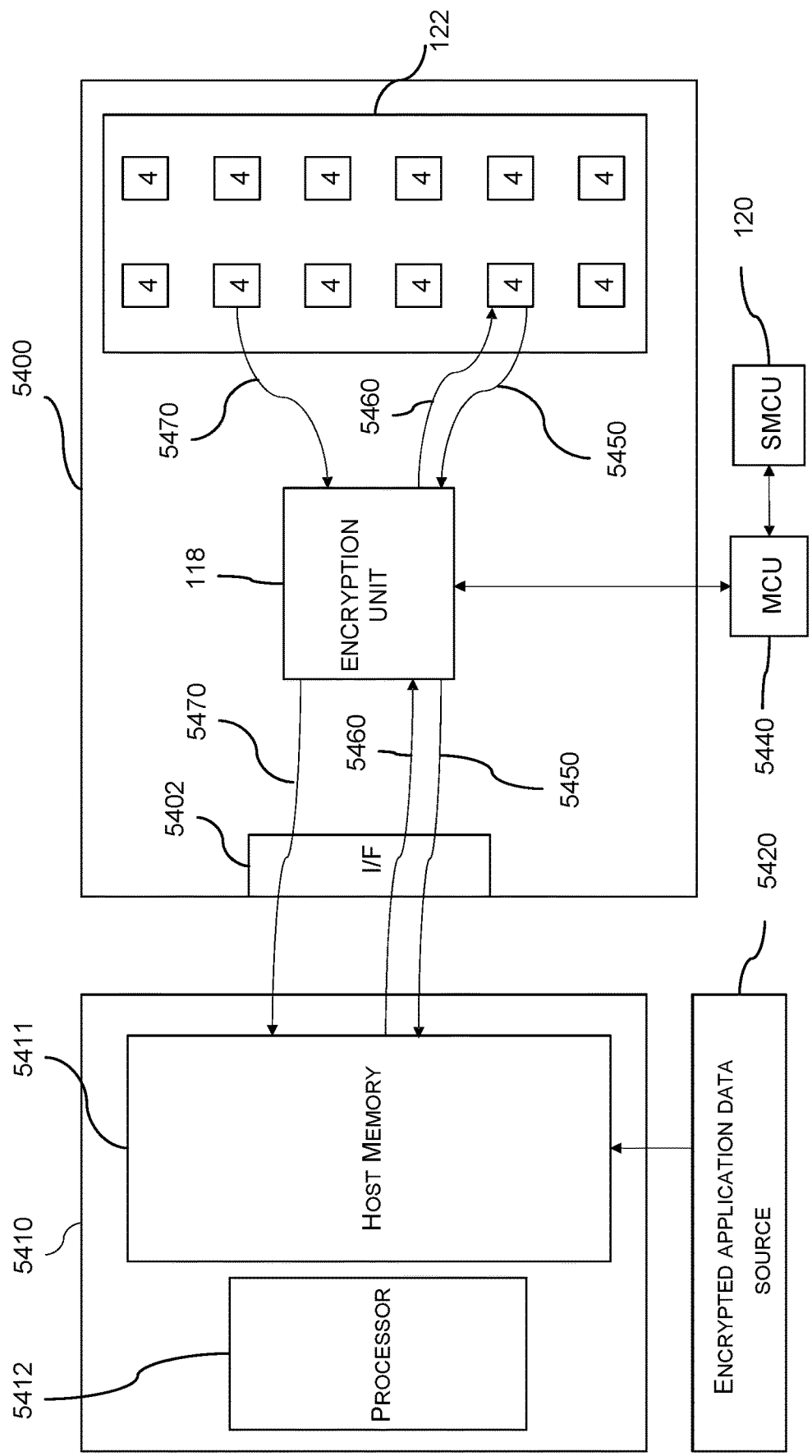
FIG. 5B is a schematic diagram illustrating the communication between processors of the accelerator subsystem and a host system.

The stream illustrated in FIG. 5 is either an ingress stream or an egress stream but not both since ingress and egress streams have different keys assigned to them. An ingress stream reads information into the tiles from the external memory. An egress stream writes data from the tiles to the external memory 108. It is possible for the codelets to be updated so that the I/O tile of a particular stream changes. An I/O tile is able to be an endpoint of more than one stream. Data transferred over a stream is divided into frames, encrypted and put into packets where an initialization vector used to encrypt the data is in a header of the packet in clear text form.

An I/O tile which is an endpoint of an ingress stream is referred to as an ingress tile. It determines, using the codelet of the tile, an expected initialization vector of a next frame of the ingress stream to be read. The ingress tile issues a read request to read a next frame of the stream from the memory region associated with the stream. Responsive to the next frame arriving in local memory of the ingress tile, the ingress tile checks that an initialization vector contained in the next frame matches the expected initialization vector. Responsive to the match failing the ingress tile generates a security exception.

An I/O tile which is an endpoint of an egress stream is referred to as an egress tile. An egress tile determines, using information about data to be written to the external memory, a size and initialization vector of a next frame of one of the streams being written from the multi-tile processing system to the external memory. It writes the initialization vector into a current frame of the stream and issues a write request for the current frame, the write request being issued to the external memory region associated with the stream. The first trusted computing entity (100 of FIG. 1) is able to check the initialization vector of the frame once retrieved from the external memory. If the initialization vector is as expected the frame is used; otherwise an authentication encryption error occurs.

FIG. 5A illustrates an example of the movement of data when data is written to host memory 70 by a tile 114a and read from host memory 70 by a tile 114b. In this example, the tiles 114a, 114b are shown as two separate tiles. However, in other examples, the tiles 114a, 114b may be the same tile. In the example, the exchange block 78 is omitted for simplification of the Figure.

The tile 114a sends one or more write requests 501 to an encryption unit 118. The one or more write requests 501 take the same form and are processed in the same way as the requests 72, 73 already discussed. The one or more write requests 501 constitute an outgoing encryption frame. The outgoing frame includes the unencrypted data. The outgoing frame from the tile 114a includes part of the initialization vector, which is determined by the tile 114a.

The encryption unit 118 completes the initialization vector (IV) by adding a count value (which is incremented for each successive plaintext block in the encryption frame). That part of the initialization vector may be 96 bits in length, with the full initialization vector being 128 bits when the count value is appended. The encryption unit 118 encrypts the data using the IVs and calculates a MAC. The calculation of the MAC happens in parallel with the encryption operations. A partial hash for determining the MAC is produced by the encryption unit 118 after the calculation of each ciphertext block, with the encryption unit 118 finalizing the MAC only when it has encrypted all of the plaintext for the frame. The outgoing frame 501 from the encryption unit 118 includes the encrypted data, the part of the initialization vector received from the tile 114a and the MAC. The encryption unit 118 sends the one or more write requests 501 to the host 71, which writes the encrypted data, the MAC and the initialization vector to host memory 70.

In response to a read request from tile 114b, the host 71 provides encrypted data in an incoming encryption frame 503. The incoming frame 503 is in the form of one or more read completions. The incoming frame 503 includes the content of the outgoing frame sent by the encryption unit 118, i.e. it includes the part of the initialization vector and the MAC in addition to the encrypted data. The incoming frame 503 is provided to the encryption unit 118. The encryption unit 118 completes the initialization vector by adding a count value (which is incremented for each successive ciphertext block in the encryption frame). The encryption unit 118 decrypts the data using the IVs and checks the MAC by recalculating it using the received ciphertext and the IVs. If the MAC is determined to be correct, the frame 102 is provided to the tile 114b.

The tile 114b checks that part of the initialization vector is as expected. The tile 114b does not require the MAC and, therefore, deletes the MAC. The tile 114b stores the decrypted data in its memory in response to determining that the part of the initialization vector is as expected.

FIG. 5B shows how an encryption unit 118 may be used to form a trusted execution environment (TEE) on an accelerator subsystem. The accelerator 5400 is an integrated circuit (i.e. a chip). In this example, the accelerator subsystem comprises a multi-tile processing unit 122. However, in other examples, the accelerator subsystem 5400 may be implemented with only a single tile 54.

The tiles 54 are configured to read data from and write data to a host memory 5411 of a host system 5410 external to the device 5400. The host system 5410 is untrusted and is unable to decrypt the application data stored in its memory 5411. The host memory 5411 is an example of memory 108 of FIG. 1.

The host system 5410 is connected to a data source 5420. The application data source 5420 is a further data processing system that is configured to communicate with the processors 54 via the host system 5410. The application data source 5420 is trusted. The application data source 5420 provides the compiled executable code that executes on the tiles 54 by writing this code in encrypted form to the host memory 5411. It is also the data source 5420 that provides encrypted application data for processing by the processing unit 122 by storing that data in the host memory 5411. This data is read by the tiles 54 of the processing unit 52. Additionally, the tiles 54 write their results of processing to the host memory 5411. Since the host system 5410 is untrusted, the application data and the results are encrypted before being stored in the host memory 5411.

The root of trust 5430 is responsible for controlling the operations performed to create, launch, and terminate a TEE on the accelerator 5400. The root of trust 5430 is a hardware module comprising processing circuitry for performing these tasks. The processing circuitry may be a processor for executing computer readable instructions held in a memory of the root of trust 5430. In the example shown in FIG. 5B, the root of trust 5430 communicates with the accelerator 5400 via a further unit 5440. The root of trust 5430 issues command to the unit 5440, which is configured to control the operation of the accelerator 5400 in response to the commands issued by the root of trust 5430. The relationship between the root of trust 5430 and the associated unit 5440 is not important. In some examples, operations described below as being performed by the root of trust 430 may be implemented using unit 440, with the units together functioning as a root of trust.

In some examples, instead of providing the root of trust 5430 separately to the accelerator 5400, the root of trust 5430 may be provided on the accelerator chip 5400 and may directly control operations of the accelerator subsystem 5400.

On start-up of the chip 5410, an autoloader hardware module (not shown in FIG. 5B) on the integrated circuit issues writes at runtime to write bootloader code (referred to as a secondary bootloader) to the tiles 54. In this way, all of the tiles 54 are initially loaded with the secondary bootloader that is used to issue read requests to load the executable application code from the host memory 5411 into the tiles 54. Once loaded with the secondary bootloader, the tiles 54 execute instructions of the secondary bootloader to issue requests to read the executable application code from host memory 5411. Once the executable application code has been loaded into the tiles 54, each of the tiles executes instructions of the application code to read application data from the host memory 5411, perform processing using that application data, and write results of processing to the host memory 5411. In this way, there is an exchange of data between tiles 54 and host memory 5411.

In order to protect the confidentiality of data (including the application code and the application data on which operations are performed when the code is executed) that is read into the tiles 54, the data may be encrypted when stored in the host memory 5411. An encryption unit 118, performs decryption operations on data read from host memory 5411 into memory of the tiles 54. FIG. 5B illustrates a read request 5450 dispatched from a tile 54. The read request 5450 comprises an address in host memory 5411 from which data is to be read. The read request 5450 is dispatched via an interface controller 5402 over a link to the host 5410. The interface controller 5402 may be a PCIe controller 5402. The host 5410 in response to receipt of the read request 5450, returns one or more read completions 5460 comprising the data read from the host memory 5411 at the identified addresses. This data is encrypted data and may take the form of one or more ciphertext blocks. The read completions 5460 are received at the encryption unit 118, which performs decryption operations using a key stored in the encryption unit 118.

The encryption unit 118 also performs encryption operations for the data written to the host memory 5411 from the tiles 54. This protects the confidentiality of the results of the processing performed by the tiles 54. FIG. 5B illustrates one or more write requests 5470 dispatched from a tile 54. The write requests 5470 each comprise an address in host memory 5411 to which data is to be written. The write requests 5470 are received at the encryption unit 118, which causes the unencrypted data in the write requests 5470 to be encrypted. Encrypting the data may comprise generating one or more ciphertext blocks from one or more plaintext blocks contained in the write requests 5470. The write requests 5470 having the encrypted data are then dispatched via interface controller 5402 over the link to the host 5410. The host 5410 causes the encrypted data to be written to the locations in host memory 5411 indicated in the write requests 5470.

Although only one encryption unit 118 is shown in FIG. 5B, in examples, there may be multiple encryption units 118, with separate encryption units 118 being provided for reading and writing of data by the tiles 54.

By encrypting and decrypting data in the manner discussed above, the encryption unit 118 ensures that data processed by the tiles 54 is processed in a trusted execution environment, where the confidentiality of that data is protected.

Fixed layout streams and flexible layout streams are now described. Fixed layout streams transfer code and/or data which is broken up into frames in a fixed order for storing in the external memory region. The fixed order is independent of an application which will use the transferred code and/or data. In contrast, flexible layout streams transfer code and/or data which is broken up into frames for storing in the external memory region in an order than can change and/or is dependent on an application which will use the transferred code and/or data. Where the order of the content (code and/or data) in the frames can change optimizations are achievable since the order can be matched to an order in which the transferred code and/or data is used by a tile receiving the stream. By making the order of the content in the frames match an order used by a tile receiving the stream, the tile has less work to do when it processes the code and/or data received via the flexible stream. However, the order used by the tile receiving the stream is typically specified by a compiled application, which is instantiated at the tile through the use of one or more codelets as described above. Thus it is difficult to re-use a flexible layout stream since the order used by the tile receiving a stream changes each time an application is compiled and each time a different application is being executed by the tile. In contrast, it is possible to re-use a fixed layout stream, either between different compilations of the same application executing on the tile, or between different applications executing on the tile, since in the case of a fixed layout stream there is no order matching.

An ingress stream is often (but not always) used to transfer a stream of training data instances to the multi-tile processing system. When transferring training data instances to the multi-tile processing system a stream generally has a fixed layout whereby the training data instances are mapped to an address space of the external memory region 500 of the stream using a fixed order of content in frames of the stream despite changes to an application consuming the stream at the multi-tile processing system.

Fixed layout streams give benefits including encrypted data instances can be re-used across different applications that operate on the same type of data instance without requiring re-encryption of the data instances. In the case of a fixed layout stream, the compiler 124 is aware of the full content of the stream. However the full content of the stream may be larger than the external memory region 500. So the content is copied in part into the external memory region 500 and then when the content has been consumed, later parts of the content are copied into the external memory region 500.

The runtime 128 (see FIG. 1) moves those subsets of content to be consumed next into the external memory region 500 that the tiles are capable of addressing. A given frame at any given time that might be required by tiles is expected (by one or more codelets at the tiles) to be at a fixed address within the external memory region 500. Once those frames have been fetched by the tiles, the external memory region 500 is freed and the same memory region populated with later frames in the stream. As the compiler 124 has orchestrated the codelets running on the tiles and the first trusted computing entity 100, this rendezvous in time and space is workable. The runtime 128 is responsible for managing synchronization between the multi-tile processing system 112 and memory 108 so the memory 108 is populated with expected data. It is not necessary that the runtime 128 is trusted as it has access to encrypted data. If the runtime 128 were to maliciously fill the memory 108 will wrong data, a security exception will be raised by encryption units of the multi-tile processing system 112 and/or tiles of the multi-tile processing system 112. A manifest produced by the compiler 124 is provided to the runtime 128 so that the runtime 128 knows how to populate the memory 108 with a stream's data.

An egress stream is often (but not always) used to transfer model weights from the tiles to the external memory. Checkpointing may be used as described in more detail below. A checkpoint is a record of the model weights at a particular point in time. Checkpoints are useful for recovering from failures of the multi-tile processing system because they enable processing to be resumed where it left off rather than having to redo work. Where checkpointing is implemented, at least one of the streams is for transferring model weights together with associated working data from the processing system to the external memory. This stream has a flexible layout whereby the stream content is put into frames of the stream in a manner which is dependent on the application executing at the multi-tile processing system. The order of the content in the checkpoint stream matches an order that one or more tiles will use when the checkpoint stream content is read back into the multi-tile processing system and consumed by the application. Flexible layout streams are particularly useful in the case of checkpointing because they bring efficiencies including reduced computation load at the tiles and reduced memory required at the tiles. Less memory is required at the tiles because flexible layout streams enable the size of the codelets that runs on the IO tiles to be reduced since instructions for rearranging stream content is omitted. In the case of checkpoint streams, since these are transferred out of the multi-tile processing system with no intention of transferring the same checkpoint stream out again, then using flexible layout streams brings good efficiencies without any draw backs.

Using codelets to instruct individual ones of the tiles to transfer encrypted data using streams is found to be particularly effective because it gives extremely fine grained control over which entities data is transferred between whilst still enabling the transfer to be secure. The compiler at the first trusted entity 100 in FIG. 1 is able to control, using codelets, which tiles are endpoints of which streams in order to achieve load balancing and other efficiencies as well as maintain security.

More detail about how the compiler compiles the codelets to achieve such benefits is now given.

The compiler assigns a logical key region to a stream and enables the stream's input/output (I/O) requests to be generated by a set of tiles corresponding to a set of exchange block contexts. A logical key region is a contiguous range of addresses within the external memory, which contain data that are encrypted using the same logical key. An exchange block context is exchange block state and resources assigned to a set of tiles for accessing the external memory.

As explained above with reference to FIG. 2 the compiler receives as input a computation graph 60 specifying a machine learning model and tile data 74. Given the computation graph 60, the compiler determines at least the following parameters for each stream.

A contiguous region of size R bytes in the external memory. In an embodiment the contiguous region reflects a small buffer in external memory.

Points in execution of the codelets at which execution is temporarily halted until encryption keys associated with a stream are loaded into the encryption units 118. The points are provided to the compiler by the machine learning framework 126 as mentioned above with reference to FIG. 2.

Which keys to load into the encryption units 118 at each of the specified points of execution where execution is to be temporarily halted until keys are loaded. The compiler decides which keys to load into the encryption units 118 at the points of execution. The compiler decides which keys to load by using knowledge of a number of available key slots as well as information about which keys are in use. There is a specified number of key slots per encryption unit in the multi-tile processing unit. If there are fewer streams than key slots the compiler spreads the streams between the key slots as evenly as possible in order to achieve improved performance.

The set of tiles that will issue read or write requests for frames in the stream. In order to determine the set of tiles for a given stream, the compiler uses at least the size of stream. The compiler is free to decide the number of key slots that will be assigned to a stream. Then the compiler decides what tile will be assigned to each key slot. The compiler selects one or more of the tiles which have keys loaded for the stream according to the size of the stream. If the stream has a size above a threshold the compiler selects more of the tiles. If the stream has a size below a threshold the compiler selects fewer of the tiles. In this way efficiencies are gained since the set of tiles uses load balancing when it is appropriate to do so.

For each tile in the set, an index indicating a starting point, and a number of frames to read or write subsequent to the starting point. The starting index corresponds to a specific initialization vector which is the initialization vector value that a stream begins with.

The compiler determines the contiguous region, which keys to load into the encryption units 118 at each of the specified points of execution where the execution is to be temporarily halted until keys are loaded, the set of tiles, and for each tile in the set, an index indicating a starting point, and a number of frames to read or write subsequent to the starting point subject to one or more constraints. A non-exhaustive list of example constraints is:

At any point, the cumulative size of regions allocated to live streams is within a threshold amount. At any point in execution of a stream, if the threshold amount is exceeded then an error is triggered.

An amount of data that can be read or written from or to a stream in a single external exchange phase is limited to R, where R is the size of the region associated with the stream. An external exchange phase is a phase of a barrier synchronization process during which the tiles communicate with the external memory.

The set of frames read during a sequence of one or more external exchange phases covers the frames in a batch. A batch is a sub-set of data instances used in a training step after which the weights of the neural network get updated.

A stream is live during an external exchange phase if it is associated with a non-zero region in the external memory and there is at least one tile, which issues a request for that stream during the external exchange phase.

The compiler selects values of the parameters in an automated manner using constraint satisfaction processes and/or rules. In some but not all embodiments the parameter values of each stream are selected based one or more of the following heuristics.

A first heuristic comprises selecting I/O tiles and the amount of space in the external memory for a stream based on one or more criteria. A non-exhaustive list of criteria to be used is one or more of: the frequency with which the stream is accessed, the amount of data read or written. Streams with large instances, such as images, are allocated a large number of I/O tiles whereas streams with small instances, such as labels, are proportionately allocated a smaller number of I/O tiles.

A second heuristic comprises a round robin allocation scheme. The second heuristic facilitates distribution of input across the I/O tiles that have been reserved after the first heuristic has been used. According to the second heuristic, frames of a stream are partitioned between the I/O tiles allocated to the stream in round robin fashion. When multiple processing units are used, the allocation extends to I/O tiles across all processing units allocated to the stream. Using a round robin scheme allows the stream to be read or written to in parallel by multiple tiles. It also removes the need for special cases when instances don't fit on an I/O tile or when instances are larger than a buffer used with the external memory.

A third heuristic comprises another allocation scheme for distributing input across the I/O tiles that have been reserved after the first heuristic has been used. According to the third heuristic, a number of frames N per tile is selected. The number of tiles Nis allocated in turn to each of the I/O tiles so that a first one of the tiles is given the first N frames, a second one of the tiles is given the next N frames and so on. Using this allocation scheme allows a stream to be read or written to in parallel by multiple tiles. It also enables streams which don't fit on an I/O tile or which are larger than a buffer used with the external memory to be accommodated.

As explained with reference to FIG. 2 the compiler receives as input tile data 74 comprising information about the number and relative locations of the tiles 114. The compiler generates each of the codelets according to a plurality of parameters determined by the compiler within specified constraints, wherein the parameters are selected from one or more of: a contiguous region of specified size in the external memory, points of execution where the execution is temporarily halted whilst encryption keys associated with a stream are loaded into the encryption unit, a set of the tiles that will issue read or write requests to the external memory, for each tile, an index indicating a starting point, and a number of frames to read or write subsequent to the starting point.

The compiler also generates a key manifest. The key manifest is a file or other record which contains the points determined by the machine learning framework 126. The points are points in execution of the sensitive code at which execution is temporarily halted whilst keys are loaded into one or more encryption units of the multi-tile processing system. The key manifest describes how registers of the encryption units 118 are to be programmed by the SMCU 120 so that the encryption unit 118 configuration adheres to the assignment of streams to tiles and memory regions.

As described in more detail below, the encryption unit 118 comprises a plurality of registers, and the processing system comprises an SMCU. The SMCU is configured to receive a key manifest from the compiler and to use the key manifest to program the registers in order that the encryption unit operates to encrypt and decrypt the data of the streams.

The key manifest optionally has metadata for a re-keying event. A re-keying event is a synchronization event between the host, SMCU, and processing unit to allow the SMCU to re-program the registers of the encryption unit. The metadata is used by the SMCU to re-program the registers of the encryption unit to reflect a new assignment of tiles and memory regions of the streams.

A programming model exposes confidential streams to the machine learning frameworks via a secure copy abstraction, which is inserted into control programs by machine learning frameworks during model compilation. A secure copy application programming interface (API) is invoked via (i) an index within the stream that is used by I/O tiles for IV generation and IV check during I/O reads and write and (ii) a set of keys that will be used for encryption and decryption of the associated confidential stream. The latter allows the compiler to assign stream keys to physical key contexts and exchange block contexts.

Once the control program is generated, the compiler obtains knowledge from the machine learning framework about when the set of keys assigned to physical contexts changes. The compiler inserts a re-keying event in the key manifest in the application manifest. This allows the runtime and SMCU to synchronize during the execution of the workload, so that the SMCU can load the rightful set of keys to the encryption units' physical contexts.

Figure 6:
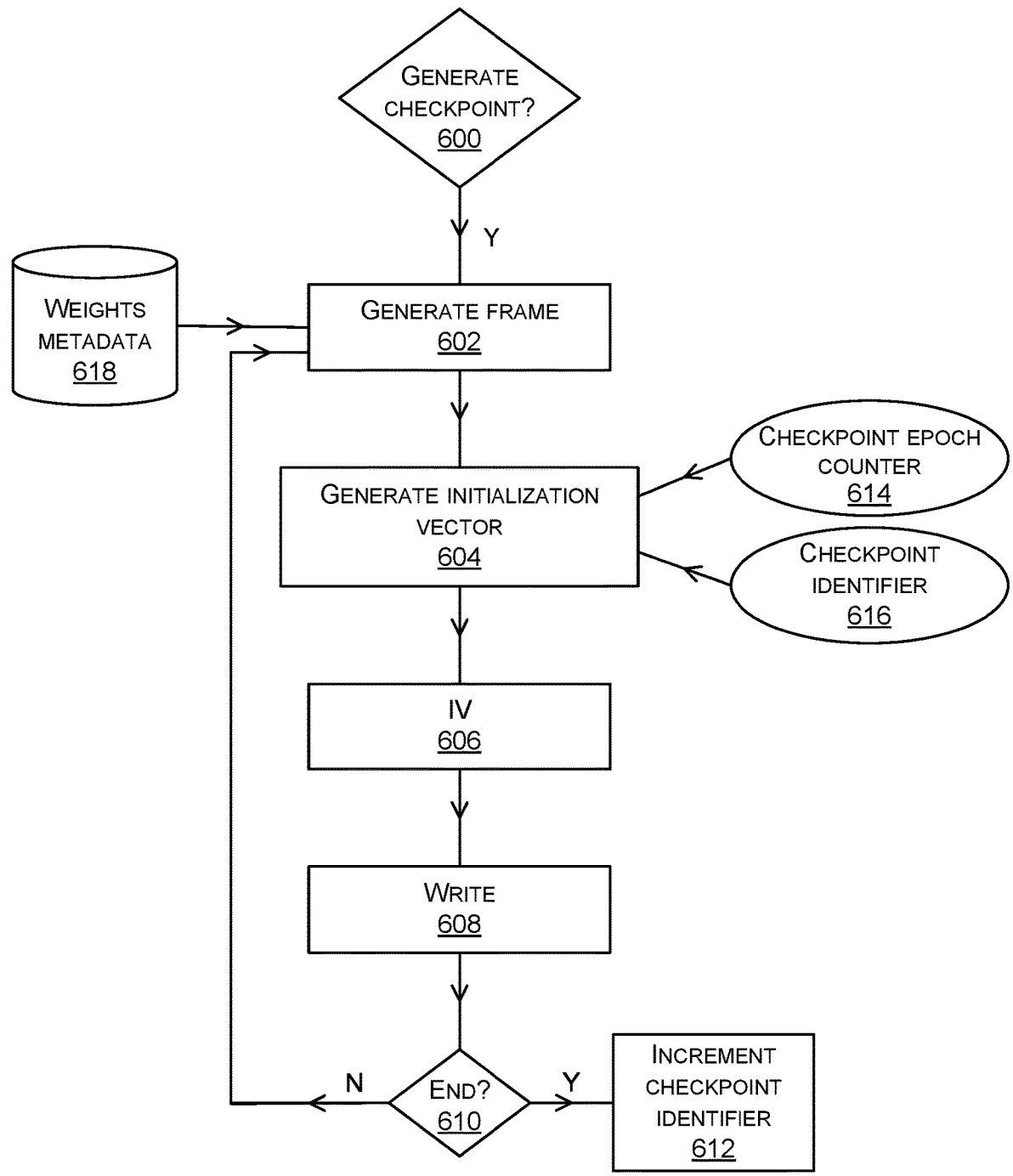
FIG. 6 is a flow diagram of process implemented at an egress tile in order to write a checkpoint to the external memory in a secure manner using a stream.
Figure 7:
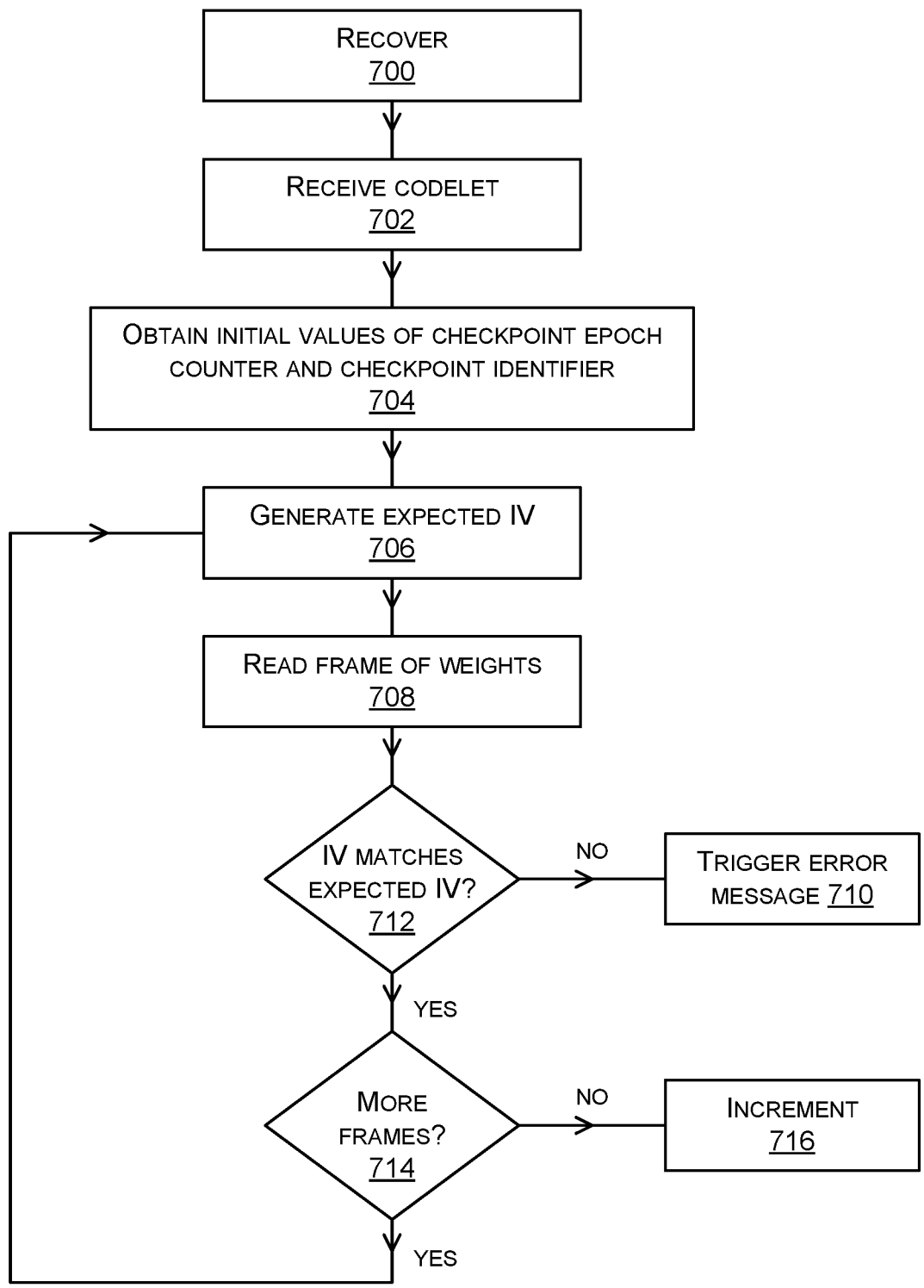
FIG. 7 is a process implemented at an ingress tile in order to read a checkpoint in a secure manner using a steam.

As mentioned above checkpointing may be used. Checkpointing is especially useful to enable recovery from failures at the multi-tile processing system without having to re-do significant amounts of a machine learning training process that the multi-tile processing system was part way through. A checkpoint is a record of the model weights at a particular point in time. It is possible to transfer a checkpoint from the tiles to the external memory using one or more streams so that the checkpoint is transferred in a secure and efficient manner. An embodiment in which secure checkpointing is implemented is now described with reference to FIG. 6 and FIG. 7. FIG. 6 describes a process implemented at an egress tile in order to write a checkpoint to the external memory in a secure manner using a stream. FIG. 7 describes a process implemented at an ingress tile in order to read a checkpoint in a secure manner using a steam.

A processing unit periodically checkpoints its state to enable recovery from failures. A checkpoint is created by writing the weights of the model currently being trained by the processing unit to an egress stream. The checkpoint also includes metadata, which include the current offset of the plurality of confidential data streams. The metadata appears in plaintext and ciphertext. The plaintext is consumed by a host runtime. The ciphertext is decrypted during loading of a checkpoint and used by the tiles that will fetch confidential data streams. The current offset is an indication of where in the training process the processing unit has currently reached. The point in the training process that a processing unit has currently reached can be expressed as a point in a sequence of training data items. Conversely, a checkpoint is restored by reading the weights (stored in the external memory as a result of the checkpoint write process) using an input stream and resuming machine learning training from the checkpointed offset.

By using streams, checkpoints are encrypted and integrity protected. In particular, tiles enforce the integrity of the process of restoring state from a previously created checkpoint. This includes protecting against attacks such as tampering of a checkpoint or attempting to load a wrong checkpoint onto a processing unit. A wrong checkpoint is where the SMCU is trying to load a checkpoint with an ID which is different than an ID of a checkpoint that the multi-tile processing system is trying to load.

A codelet is generated by the compiler and deployed at a tile to read a checkpoint stream. The codelet generates a sequence of expected IVs, checks that the IVs returned in the frames match the expected IV, and strips the IV and authentication tag from the frames. A codelet is generated by the compiler to write a checkpoint stream. The codelet generates a sequence of IVs and places each of them in the header of a frame.

The IV for each frame is constructed according to a format having a plurality of fields. The fields comprise a stream type field which is used to indicate that the stream is for a checkpoint, a checkpoint epoch counter field which is incremented when the machine learning process resumes at the multi-tile processor, a checkpoint identifier field which starts at 1 for the first checkpoint and increments by one for every subsequent checkpoint, a processing unit identifier field which has a local identifier of the processing unit, a tile identifier field which has an identifier of a tile to which the frame is to be deployed, an index field which has an index of the frame within the stream. The index starts at 0 for the first frame and increments by 1 for every subsequent frame.

The tiles reading or writing a checkpoint generate the IV sequence as follows:

Tiles obtain the initial value of the checkpoint epoch counter and checkpoint identifier from pre-determined locations in tile memory. These values are written into tile memory by the SMCU. Tiles use these initial values to generate the expected IVs while reading a checkpoint. After reading the checkpoint, each tile increments the checkpoint epoch counter and checkpoint ID. Tiles use the current values of the checkpoint epoch counter and checkpoint ID to generate IVs for all subsequent checkpoints generated by the processing unit within the checkpoint epoch. A checkpoint epoch denotes a time period after a checkpoint has been loaded until a new checkpoint is loaded. Thus a checkpoint epoch counter denotes the number of times the computation has restarted. After writing each checkpoint, each tile increments the checkpoint identifier.

By using the checkpoint epoch counter and the checkpoint identifier to generate the expected initialization vectors, and then checking the expected initialization vectors against the actual received initialization vectors, the stream gives security and integrity to the checkpointing process.

FIG. 6 describes a process implemented at an egress tile in order to write a checkpoint to the external memory in a secure manner using a pair of streams one of which is confidential and the other of which is a plaintext stream. The machine learning framework 126 creates instructions which are a control program to control a tile to write a checkpoint. The control program is in one or more codelets at the egress tile. The control program comprises two copies (instructions that move data between the external memory and the tile memory); one for the plaintext stream and one for the confidential stream The control programs at the egress tile checks 600 whether to generate a checkpoint. The check is made according to one or more criteria comprising: a time interval, a packet error rate, an instruction from the SMCU, a power level, or other criteria. When the egress tile finds the check 600 is passed it accesses metadata (about the stage the training process has reached) and/or model weights and generates a frame 602 containing model weights and/or metadata. The metadata (which comprises an offset of a plurality of confidential data streams) is used by the I/O tiles that fetch the confidential data streams. The metadata comprises working data such as values of counters which are useful to indicate what stage the training process has reached so that when training is resumed it can be resumed at the correct point of the process. Thus the I/O tiles know how to resume data fetch after loading a checkpoint. The egress tile accesses the weights and/or model data from its local memory and/or from other tiles. Where more than one tile is working on the stream, there is an internal exchange of model weights and metadata between the tiles working on the stream, so that the appropriate data is included in the checkpoint.

The egress tile reads from its local memory a current value of the checkpoint epoch counter 614 and a current value of the checkpoint identifier 616. Using the values it generates 604 an initialization vector. The egress tile calculates an IV 606, places the IV in a header of the frame and forms one or more packets containing the frame. The frame is sent out as a write request which goes through the encryption unit in the case of the confidential stream and without going through the encryption unit in the case of the plaintext stream. The egress tile writes 608 the packet(s) to the external memory of the confidential stream and does the same for the plaintext packets of the plaintext stream. The egress tile checks 610 whether to end the process by checking whether there are more weights or metadata to be written. If enough of the model weights and metadata has been written the process at the tile moves to operation 612 and increments the checkpoint identifier. If more model weights or metadata are to be written the process at the tile moves to operation 602 and continues. Where the tile is within a trusted execution environment at the multi-tile processing system the process of FIG. 6 is secure. The runtime 128 of FIG. 1 is able to access the plaintext metadata from the external memory of the plaintext stream.

FIG. 7 describes a process implemented at an ingress tile in order to read a checkpoint in a secure manner using a steam. The ingress tile has recovered 700 from a failure perhaps as a result of the multi-tile processing system rebooting. The ingress tile receives 702 a codelet from the compiler which has been transferred to the multi-tile processing system in a secure manner. Regarding the offsets from which data streams will resume from, the codelet takes into account metadata from the confidential stream of the checkpoint which is decrypted by the encryption units and appears plaintext in tile memory. The ingress tile obtains 704 initial values of the checkpoint epoch counter and checkpoint identifier from its local memory. The SMCU has previously written the checkpoint epoch counter and checkpoint identifier values into the tile local memory.

The ingress tile generates 706 an expected IV using the initial values of the checkpoint epoch counter and checkpoint identifier and according to the format mentioned above. That is, it sets a value in the stream type field to indicate the type is checkpoint, it adds a local identifier of the processing unit, it adds an identifier of the egress tile, it adds an index of the frame within the stream.

The ingress tile reads 708 a frame of a checkpoint from the external memory region of the confidential stream of the ingress tile. The frame contains model weights and/or metadata. The ingress tile checks 712 whether the IV of the read frame matches the expected IV generated at operation 706. If the match fails the ingress tile triggers 710 a security exception. If the match passes the ingress tile checks whether there are more frames of the checkpoint confidential stream to be read. If not the ingress tile increments 716 the checkpoint epoch counter and resets the checkpoint ID. If there are more frames of the checkpoint confidential stream to be read the process moves to operation 706 of FIG. 7 and continues. Regarding the metadata about the offsets from which data streams are to resume after a checkpoint is loaded, the metadata are available in plaintext for consumption by the runtime 128 (see FIG. 1), from the plaintext stream of the checkpoint.

The SMCU is configured to provision two checkpointing keys, one for encrypting model weights and metadata to be written for a new training epoch and one for decrypting model weights and metadata to be read from a previous epoch. One checkpointing key is for a checkpoint egress stream and another checkpointing key is for a checkpoint ingress stream.

More detail about how the SMCU derives the two checkpointing keys is now given.

An epoch, e, occurs when re-starting a job from a checkpoint written during the previous epoch, e−1. A job is described using an application manifest, M. An example of a job is a machine learning training task.

Encrypting and decrypting checkpoints is done by using the SMCU to provision two checkpointing keys: one for writing checkpoints of a new epoch, e, and another for reading checkpoints from the previous epoch, e−1. The SMCU uses secret shares provided by the job participants (s0, . . . , sT−1) to derive the checkpointing keys as shown below. The job participants are the streams being used in the machine learning training task and the stream identifiers of the streams are denoted s0, to sT−1 The SMCU derives two secrets $st^e$ and $st^{e-1}$ specific to the job, current epoch and tenant as follows $s_t^{e-1}=KDF[s_t](HASH(M)\|e-1)$ $s_t^e=KDF[s_t](HASH(M)\|e)$ $S^{e-1}=\{s_0^{e-1}, \ldots, s_{t-1}^{e-1}\}$ $S^e=\{s_0^e, \ldots, s_{T-1}^e\}$ Which is expressed in words as, a secret s for tenant t and epoch e−1 is equal to a key derivation function (KDF) applied to a stream identifier st as key material and a salt which is a concatenation of the hash of the application manifest and the previous epoch e−1. Any well-known key derivation function is used. A secret $st^e$ which is a secret s for tenant t and epoch e is equal to a key derivation function applied to a stream identifier st as key material and a salt which is a concatenation of the hash of the application manifest and the current epoch e.

A secret Se−1 for the previous epoch is a concatenation of the secrets of each of the streams being used in the machine learning task's previous epoch. A secret for the current epoch is a concatenation of the secrets of each of the streams being used in the machine learning task current epoch.

The SMCU, with SMCU identifier i, derives a key ckie−1 for decrypting checkpoints created during the previous epoch as follows.

$ck_i^{e-1}=KDE[S^{e-1}](\text{"CHECKPOINT"}\|1)$

Which is expressed in words as, a checkpoint key derived by SMCU i for the previous epoch is equal to the result of a key derivation function applied to the secret for the previous epoch and a salt which is the string CHECKPOINT concatenated with the index i of the SMCU.

The SMCU, with SMCU identifier i, derives a key $ck_i^e$ for encrypting checkpoints created during the current epoch as denoted below $ck_i^e=KDF[S^e](\text{"CHECKPOINT"}\|1)$ Which is expressed in words as, a checkpoint key derived by SMCU i for the current epoch is equal to the result of a key derivation function applied to the secret for the current epoch and a salt which is the string CHECKPOINT concatenated with the index i of the SMCU.

As mentioned above, the use of shuffling makes deployment of streams extremely difficult where the streams are used to transfer data and/or code in a confidential, secure manner via an external memory or host which is untrusted. In particular, shuffling the dataset changes the sequence at which data instances are fetched by the tiles, and subsequently the order at which initialization vectors are to be authenticated. The inventors have created a solution whereby a first stream is used in conjunction with a second stream, referred to as a permutation stream, such that shuffling is enabled together with the use of streams in an efficient and practical manner.

Figure 8:
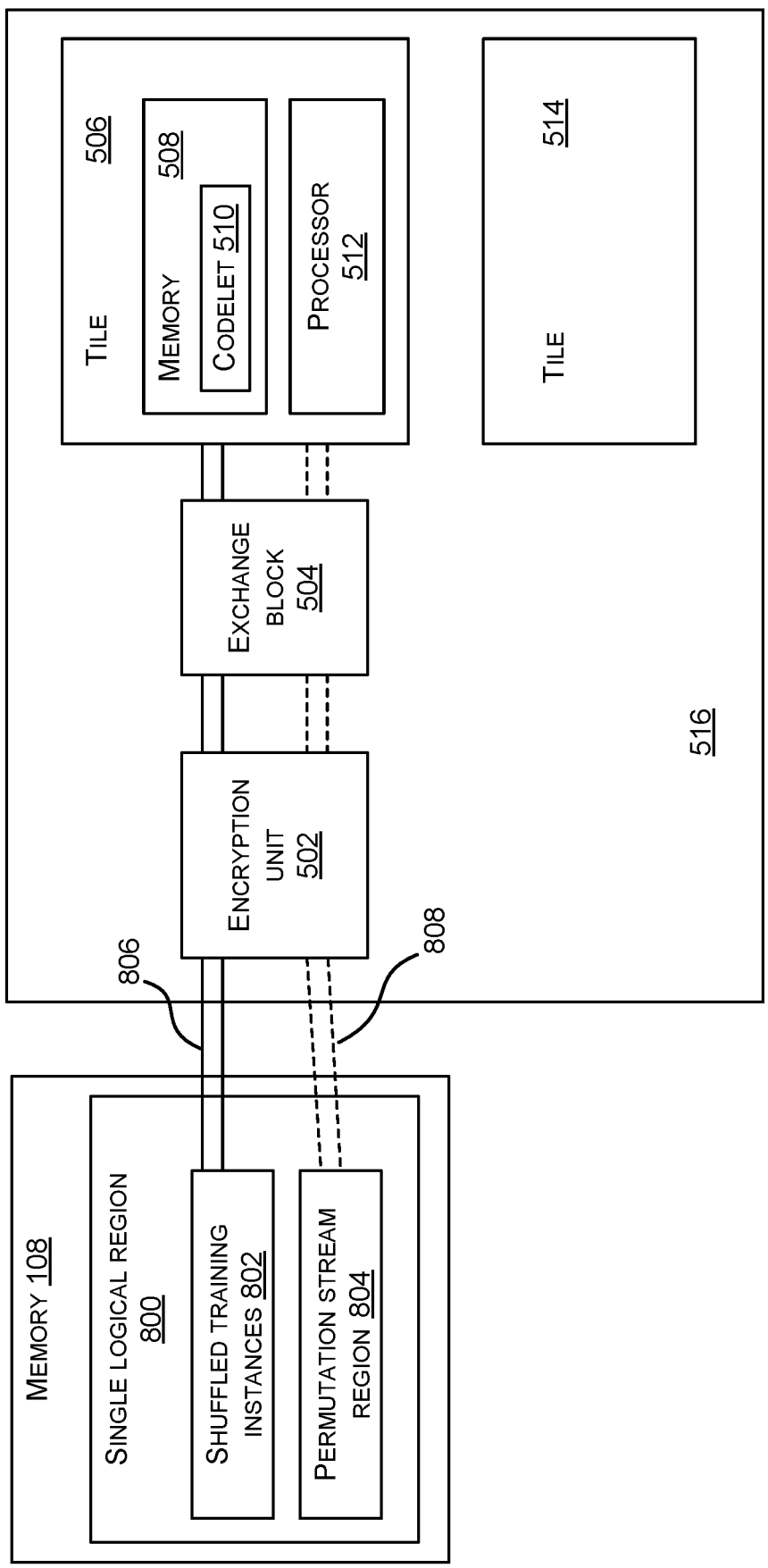
FIG. 8 is a schematic diagram of a multi-tile processing system used with an external memory and where there is a stream for transferring shuffled training data instances, and a permutation stream.

FIG. 8 is a schematic diagram of a multi-tile processing system 516 used with an external memory 108 and where there is a stream 806 for transferring shuffled training data instances (referred to as an ingress stream), and a permutation stream 808. The external memory 108 has a single logical region 800 comprising a region storing shuffled training instances 802 as well as a permutation stream region 804. The permutation stream region stores a sequence index for each frame of the ingress stream. By using the permutation stream shuffling of the training data instances is enabled together with the use of streams.

By using a single logical region 800 for both the shuffled training instances of the ingress stream and the sequence index of the permutation stream, it is possible to use the same keys at the encryption unit 502 for both streams. Doing so gives efficiency whilst maintaining security. However, note that it is not essential to use the same logical region 800 for both the shuffled training instances and the sequence index.

With reference to FIG. 8, tile 506 is an ingress tile for reading into the multi-tile processing system the shuffled training instances 802. The ingress tile 506 reads in shuffled training instances from memory region 802 of the external memory 108. The ingress stream has initialization vectors in the clear in the same way as for other ingress streams as described above. The ingress tile 506 desires to know the order of the initialization vectors of the frames of the shuffled training instances so that it is able to carry out a freshness check against the expected initialization vectors in the same way as other ingress tiles as described above.

The ingress tile 506 has a codelet 510 from the compiler. The codelet has information identifying the external memory region 802 of the ingress stream. The codelet 510 has instructions for generating the expected initialization vectors for the ingress stream but not the sequence for them. The codelet 510 also has information identifying the external memory region for the permutation stream since the same logical region is used as for the ingress stream.

The ingress tile 506 reads shuffled training data from the ingress stream and obtains the initialization vector from the packet in which the read data is received. The ingress tile is to perform a freshness check on the obtained initialization vector since it has been received in the clear.

The ingress tile 506 reads from the external memory region 804 of the permutation stream at a location in a sequence corresponding to the current shuffled training data item. The read gives a frame which is encrypted. The multi-tile processing system decrypts the frame to obtain a sequence number. The ingress tile obtains an initialization vector (for the permutation stream) which was in the frame in the clear. The ingress tile checks the initialization vector against an expected initialization vector as it would for any other confidential stream (to check freshness). The permutation stream is accessed sequentially, so the codelet includes code for generating the next IV by just incrementing the sequence index. If the check fails an error is generated. If the check passes the sequence number is available for checking the freshness of the ingress stream.

The ingress tile uses the sequence number to carry out a freshness check of the packet it read from the ingress stream. It uses the sequence number together with information in the codelet to generate an expected IV. It compares the excepted IV with the IV received in the packet read from the ingress stream. If there is a match the check passes and the data in the packet comprising a training data instance or part of a training data instance is used by the multi-tile processing system for machine learning. Otherwise, if there is no match, an error is triggered and the process aborts.

As a storage optimization, the permutation stream may contain only the sequence index of the first frame of the data instance of the stream. Because the codelet knows how many frames need to be accessed, the codelet instructs the ingress tile to re-use the current index for the entire data instance and to read the next index within the current permutation frame when the next data instance is fetched. When all indexes within a permutation stream are consumed, the codelet accesses the next permutation frame. Note that it is not essential to use the storage optimization mentioned in this paragraph and that in some embodiments the permutation stream contains the full sequence index.

Figure 9:
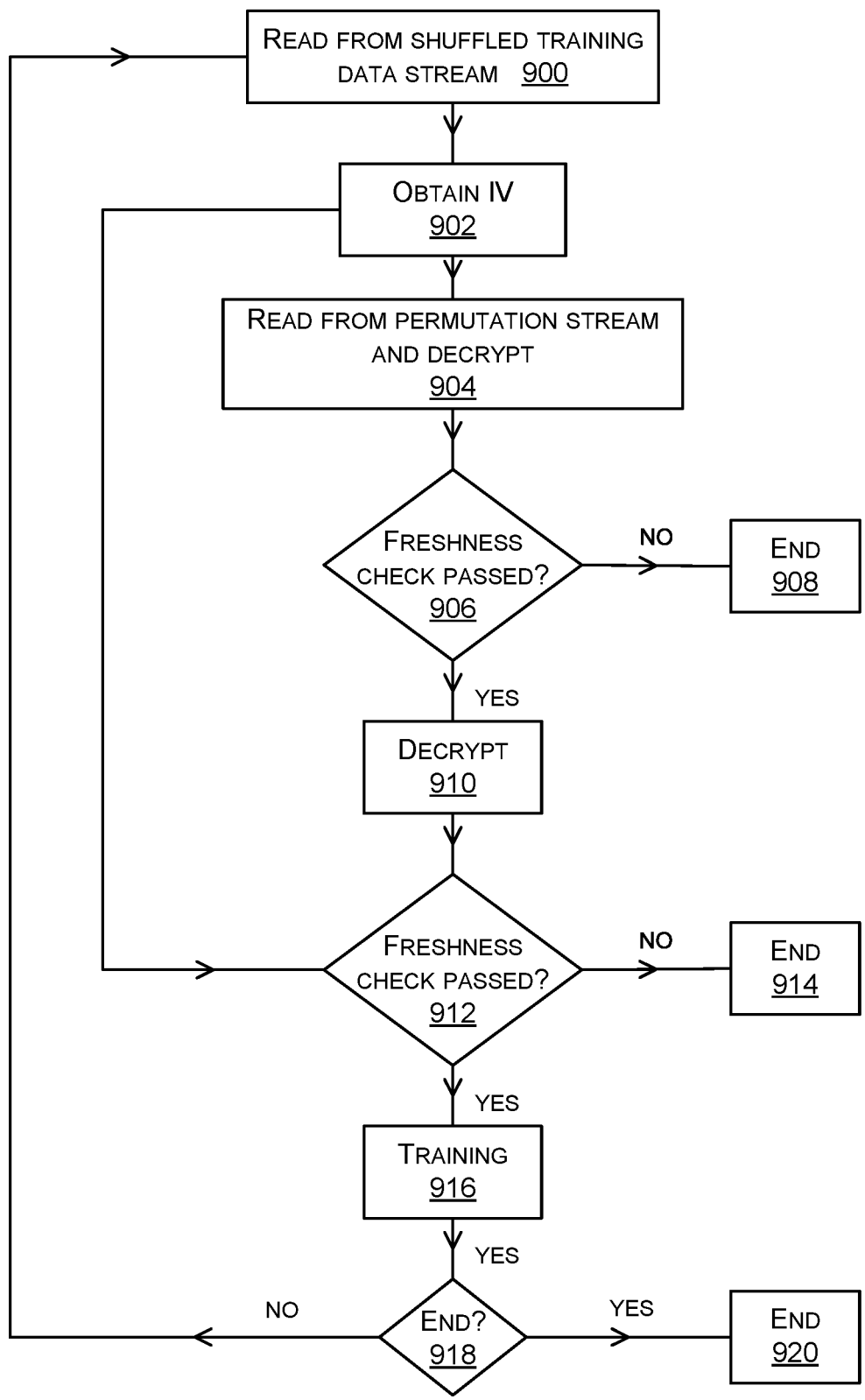
FIG. 9 is a flow diagram of a method performed by a multi-tile processing system to support the use of streams for shuffled training data instances.

FIG. 9 is a flow diagram of a method of operation at a multi-tile processor which is suitable for use where there are shuffled data instances at the external memory. Prior to the process of FIG. 9, the data instances (also referred to as training samples) are shuffled by a tenant of the data centre such as party 1 302 of FIG. 3 using any suitable shuffling algorithm. The tenant creates a shuffle (by applying a shuffling algorithm to the data instances) for each epoch and captures the sequence of IVs of the shuffle in a memory region (region 804) of the external memory in encrypted form. The per-epoch sequence of IVs is stored in cleartext in the external memory. The data instances are not shuffled and are uploaded to the external memory (region 802) only once. The runtime uses the cleartext sequence of IVs to populate direct memory access buffers with the frames that the tiles expect to fetch.

With reference to FIG. 9, the multi-tile processor reads from the shuffled training data stream by reading from external memory region 802. It obtains 902 an IV from a packet of the read information. The multi-tile processor desires to check the freshness of the IV which has been read but has to wait to do so until it has obtained information from the permutation stream about the IV sequence.

The multi-tile processor reads 904 from the permutation stream. It next checks 906 the freshness of the data read from the permutation stream. The freshness check comprises obtaining an IV from a packet of the read data from the permutation stream and making a comparison. The comparison is between the IV from the packet (which is in the clear and does not need to be decrypted) and an expected IV generated by the multi-tile processor. If the comparison is successful the multi-tile processor proceeds to decrypt 910 the read data from the permutation stream. If the comparison finds a discrepancy between the IV from the packet and the expected IV then the process ends 908 after triggering a security exception.

Where the comparison at the permutation stream freshness check 906 finds a match the multi-tile processor proceeds to check the freshness of the shuffled training data stream at check 912. The multi-tile processor has the sequence index of the expected IV from the decryption operation 910 where the permutation stream was decrypted. It uses that together with a codelet from the compiler to generate an expected IV. The multi-tile processor compares the IV from operation 902 with the expected IV. If there is a difference then the process ends 914 after triggering a security exception. If there is a match then the process continues with executing machine learning training 916 at the multi-tile processor using the data from the shuffled training data stream.

The multi-tile processor checks 918 whether the machine learning training process is complete by checking whether one or more criteria are met. The criteria are one or more of: a specified number of training instances have been processed, a specified time interval has elapsed, an amount of change of weights of the machine learning model is below a threshold. If the machine learning training is complete the process ends 920. If the machine learning process is to continue the method of FIG. 9 returns to operation 900 and repeats.

A detailed example of creating and deploying a permutation stream is now given for the case where the training samples are images. This example is also applicable to other types of training samples such as audio files, speech signals, documents and other training samples.

In a packaging phase software at a tenant's computing facility (such as party 1, 302 of FIG. 3) shuffles training data instances and creates data for the permutation stream. During the packaging phase the software at the tenant's computing facility, or elsewhere, captures a sequence of training samples for each training epoch. The sequence of training samples is generated according to a shuffling algorithm specified by the tenant or other party. The per-epoch training sample sequences are converted to a sequence of IV indexes based on how the training samples are split into encrypted frames by the encryption units 118 of the multi-tile processor.

As an example, consider that a training job runs 2 epochs on a dataset of 4 images, where each image is a matrix partitioned into a specified number (67 in this example) of frames.

For the following permutations

Epoch 0: 3 1 2 0

Epoch 1: 0 2 3 1 and assuming that the data encryption tool assigns the following IV indexes to the images.

Image 0: 0, 1, . . . 64, 65, 66 (labelled as DF0 . . . DF66)

Image 1: 67, 68, . . . 131, 132, 133 (labelled as DF67 . . . DF133

Image 2: 134, 135, . . . 198, 199, 200 (labelled as DF134 . . . DF200)

Image 3: 201, 202, . . . 265, 266, 267 (labelled as DF201 . . . DF267)

The following permutations of IV offsets are constructed for each epoch:

Permutation 0: 201, 67, 134, 0

Permutation 1: 0, 134, 201, 67

The constructed sequence of IV offsets for each epoch are aggregated into one stream and split into a sequence of frames that is encrypted following an encryption protocol used by the multi-tile processing system. In an example, the encryption logic at the encryptor 106 of the first trusted computing entity 100 constructs a 128-bit IV for each frame.

In the case of 128-byte frames, each permutation stream consists of one frame containing all four IV offsets for the data stream.

Permutation 0→IV index: 0; Data: 201, 67, 134, 0 (labelled as PF0)

Permutation 1→IV index: 1; Data: 0, 134, 201, 67 (labelled as PF1)

During the packaging phase, the compiler 124 at the first trusted computing entity 100 is provided with a computation graph 60 representing a training loop on each processing unit. Some nodes in the computation graph 60 represent read and write operations from and to streams. Each data stream is correlated with a permutation stream. The permutation stream is associated with the same stream identifier as its parent data stream and the size of the instance (i.e., the size of the IV index). This means that corresponding labels are associated with a distinct permutation stream although the permutation is the same.

A read operation reads IVs from the permutation stream and data (typically a batch) from the shuffled training sample stream. It uses the former to authenticate the latter. Upon successful IV check, the multi-tile processor distributes the training sample data to a tensor mapped across multiple tiles.

The compiler 124 takes the following into account:

Determine a contiguous region in external memory 108 and use the parent's parameters (the parameters determined by the compiler 124 for the shuffled training data stream) to determine the remaining parameters for the permutation stream. The allocated external memory region for both streams is one logical region 800 so that the same encryption keys are used by the multi-tile processing system when it accesses the two streams.

In some but not all examples, the frames of the shuffled training instance data stream are partitioned between a plurality of I/O tiles at the multi-tile processing system in round robin fashion.

Each I/O tile reads the permutation stream so it has access to the IV offset of the frames of the data stream.

In the present example, assuming 4 I/O tiles, each tile is responsible for reading the following frames:

Tile 0: PF0, EVA[0], EVA[4] . . . EVA[264]; PF1, EVA[268], EVA[271] . . . EVA[531]

Tile 1: PF0, EVA[1], EVA[5] . . . EVA[265]; PF1, EVA[269], EVA[272] . . . EVA[532]

Tile 2: PF0, EVA[2], EVA[6] . . . EVA[266]; PF1, EVA[270], EVA[273] . . . EVA[533]

Tile 3: PF0, EVA[3], EVA[7] . . . EVA[267]; PF1, EVA[271], EVA[274] . . . EVA[534]

Which is expressed in words for tile zero as, tile zero is responsible for reading permutation frame zero, reading shuffled training sample stream frame EVA[0] which is a frame with encrypted virtual address zero, reading every fourth frame from the shuffled training sample stream until the 264th frame, then reading the first permutation stream frame, then reading every 4th frame from the shuffled training sample stream until the 531st frame and so on.

An encryption protocol used by the encryptor 106 and encryption units 118 partitions the input and output data streams into equally-sized frames and associates each frame in each stream with a unique value called the Encrypted Virtual Address, or EVA.

The compiler 124 generates the I/O tile code (i.e. the codelets 510) taking into account the following factors.

For each image, the I/O tile reads a static sequence of frames by accessing the tile address space following the static partitioning of frames across I/O tiles. Codelets 510 use the image counter/index to access the corresponding IV offset within the permutation frame as follows: PermutationIndex=ImageCounter % ((PermutationFrameSize−32)/IV_Index_Size). Codelets use the frame counter to re-construct the frame's IV as follows: IV_Index=IVOffset+FrameCounter. If the IV offsets in a permutation frame are exhausted, codelets 510 fetch the next permutation frame as follows: PermutationFrame=ImageCounter/((PermutationFrameSize−32)/IV_Index_Size).

When the multi-tile processing system is running in a confidential mode, where there is trusted execution environment on the tiles, the streams include a plaintext version of the IV offsets to know what data frames are populated into the external memory. This allows the I/O tiles to fetch frames of images (following a static access pattern) and rely on the IV offsets (dynamic information) to perform the IV check.

In the present example, the following frames are loaded into the external memory mapped to the EVA of the data stream. In the example below DF denotes data frame. There is one example with two permutations as the example shows different data frames loaded to the EVA space each time.

Permutation 0:

EVA[0 . . . 66]→DF201 . . . DF267;

EVA[67 . . . 133]→DF67 . . . DF133;

EVA[134 . . . 200]→DF134 . . . DF200;

EVA[201 . . . 267]→DF0 . . . DF66

Permutation 1:

EVA[0 . . . 66]→DF0 . . . DF66;

EVA[67 . . . 133]→DF134 . . . DF200;

EVA[134 . . . 200]→DF201 . . . DF267;

EVA[201 . . . 267]→DF67 . . . DF133

Figure 10:
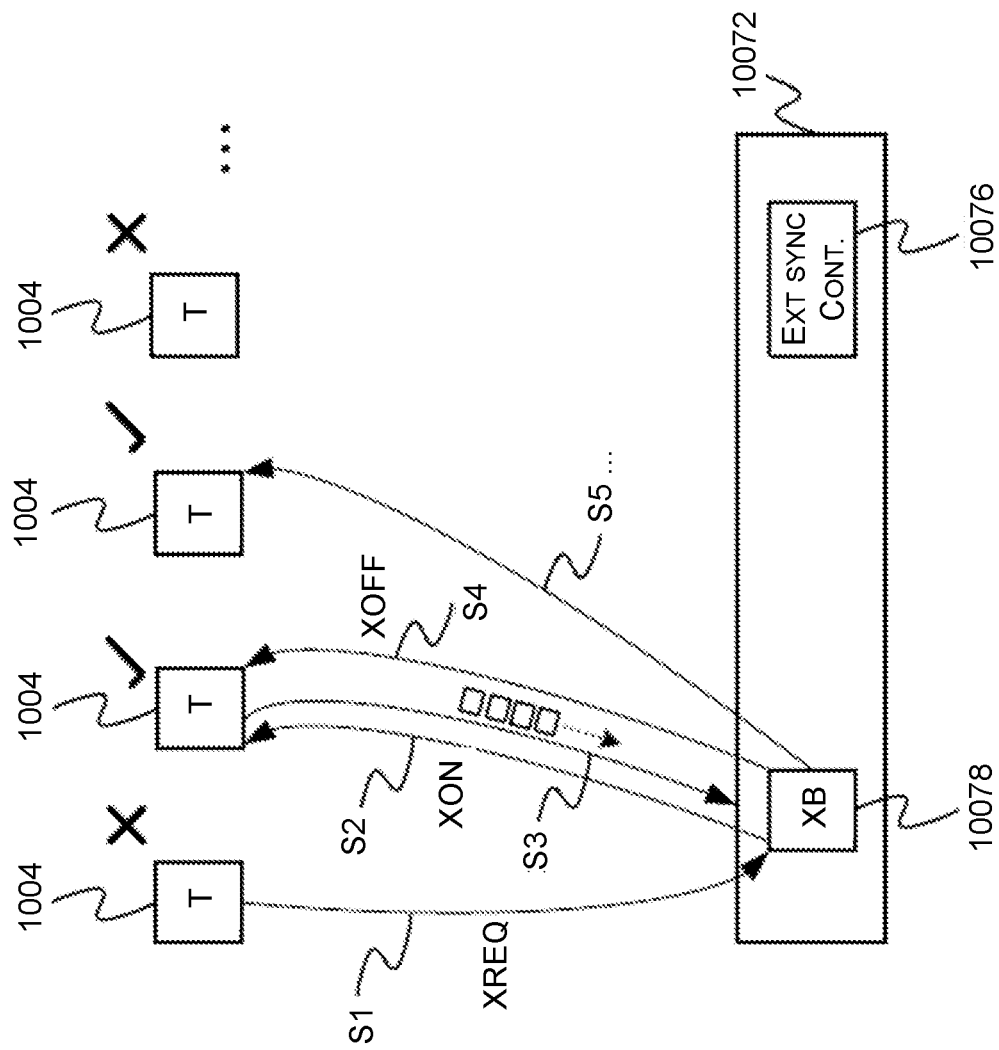
FIG. 10 illustrates a mechanism for sending data packets from tiles to destinations external to a processing unit.

FIG. 10 illustrates an exemplary mechanism for sending data packets from tiles to destinations external to the multi-tile processing unit. This mechanism is non-time-deterministic. The mechanism is implemented in dedicated hardware logic in external interconnect 10072. Data is sent over the external interconnect 10072 in the form of packets. Unlike the packets sent over an internal interconnect 10034, these packets have headers: as the order of transmission can change, they require the destination address to be present in the packet header. The external interconnect 10072 includes a routing table for statically routing the data packets between the different processors in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 10072. The possibility for loss and resending at the data link layer, however, means that the delivery of data packets over the external interconnect 10072 is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 10072 comprises an external exchange block (XB) 10078. The compiler nominates one of the tiles 1004 to send an external exchange request (XREQ) to the exchange block 10078 (operation S1). The XREQ is a message comprising one or more control packets, indicating which of the tiles 1004 have data packets (content) to send. This is illustrated schematically in FIG. 10 by the ticks and crosses: by way of an example scenario, those labelled with a tick have data packets to send externally and those labelled with a cross do not. In operation S2, the exchange block 10078 sends an exchange-on (XON) control packet to a first of the tiles 1004 with data to send externally. This causes the first tile to start sending its packets to the relevant destination via the external interconnect 10072 (operation S3). The data packets received from the first tile 1004 at the external interconnect are statically routed to the destination using a routing table in the external interconnect 10072. If at any time, the XB 10078 is unable to continue sending packets to the interconnect (e.g. due to a previous packet loss and re-transmission in the interconnect, or due to over-subscription of the external interconnect by many other XBs and tiles) the XB 10078 will send an exchange-off (XOFF) to that tile 1004 before the XBs 10078 queue overflows. Once the congestion is cleared and the XB 10078 again has sufficient space in its queue it will send an XON to the tile 1004 allowing it to continue transmitting its content. Once this tile 1004 has sent its last data packet, then in operation S4 the exchange block 10078 sends an exchange-off (XOFF) control packet to this tile 1004, then in operation S5 sends another XON to the next tile 1004 with data packets to send, and so forth. The signaling of XON and XOFF are implemented as a hardware mechanism in dedicated hardware logic in the form of the external exchange block 10078.

Figure 11:
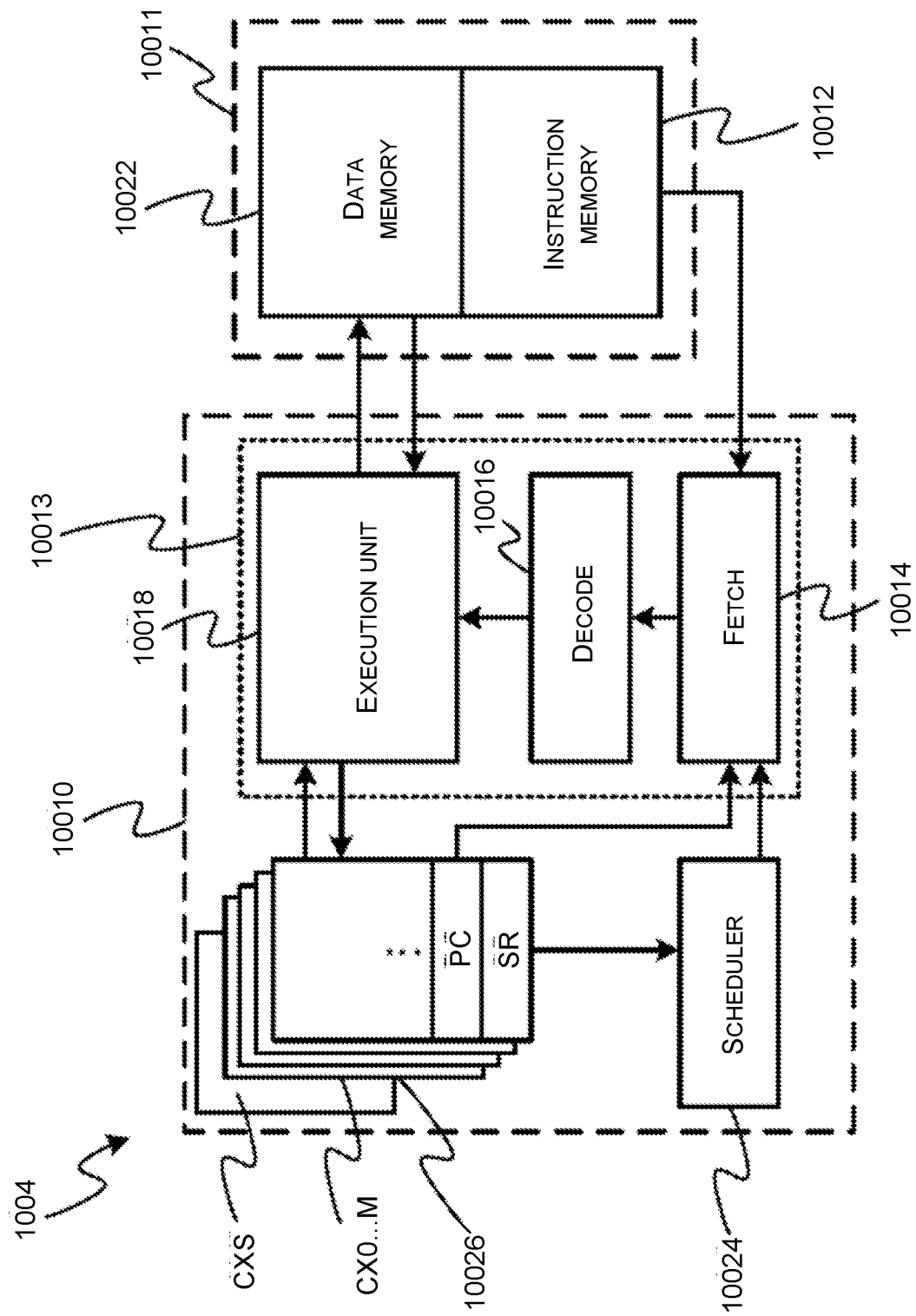
FIG. 11 illustrates an example of a processor tile.

Each of the processor tiles 1004 comprises processing circuitry and memory. In some example examples, the processing circuitry is a multi-threaded processor 10010. FIG. 11 illustrates an example of a processor tile 1004 in accordance with examples of the present disclosure. The processor tile 1004 comprises a multi-threaded processor 10010 in the form of a barrel-threaded processor 10010, and a local memory 10011 (i.e. on the same tile in the case of a multi-tile array, or same chip in the case of a single-processor chip). A barrel-threaded processor 10010 is a type of multi-threaded processor 10010 in which the execution time of the pipeline is divided into a repeating sequence of interleaved time slots, each of which can be owned by a given thread. This will be discussed in more detail shortly. The memory 10011 comprises an instruction memory 10012 and a data memory 10022 (which may be implemented in different addressable memory unit or different regions of the same addressable memory unit). The instruction memory 10012 stores machine code to be executed by the processing unit 10010, whilst the data memory 10022 stores both data to be operated on by the executed code and data output by the executed code (e.g. as a result of such operations).

The memory 10012 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10010, multiple different ones of the threads from the instruction memory 10012 can be interleaved through a single execution pipeline 10013 (though typically only a subset of the total threads stored in the instruction memory can be interleaved at any given point in the overall program). The multi-threaded processor 10010 comprises: a plurality of context register files 10026 each arranged to represent the state (context) of a different respective one of the threads to be executed concurrently; a shared execution pipeline 10013 that is common to the concurrently executed threads; and a scheduler 10024 for scheduling the concurrent threads for execution through the shared pipeline in an interleaved manner, preferably in a round robin manner. The processor 10010 is connected to a shared instruction memory 10012 common to the plurality of threads, and a shared data memory 10022 that is again common to the plurality of threads.

The execution pipeline 10013 comprises a fetch stage 10014, a decode stage 10016, and an execution stage 10018 comprising an execution unit which may perform arithmetic and logical operations, address calculations, load and store operations, and other operations, as defined by the instruction set architecture. Each of the context register files 10026 comprises a respective set of registers for representing the program state of a respective thread.

It is desirable in some circumstances to provide for the confidentiality of data that is provided for execution on a multi-tile processing unit. Typically confidentiality is provided by encryption of data. One type of encryption algorithm that is useful for the encryption of large amounts of data is a block cipher encryption, which operates on fixed sized groups of data, referred to as blocks.

There are different types of block cipher modes of operation, some of these make use of unique set of data referred to as an initialisation vector. The initialisation vector ensures that different encrypted data is produced from the same unencrypted data by the encryption algorithm. This has the advantage of preventing an attacker from being able to identify patterns in encrypted data.

Figure 12:
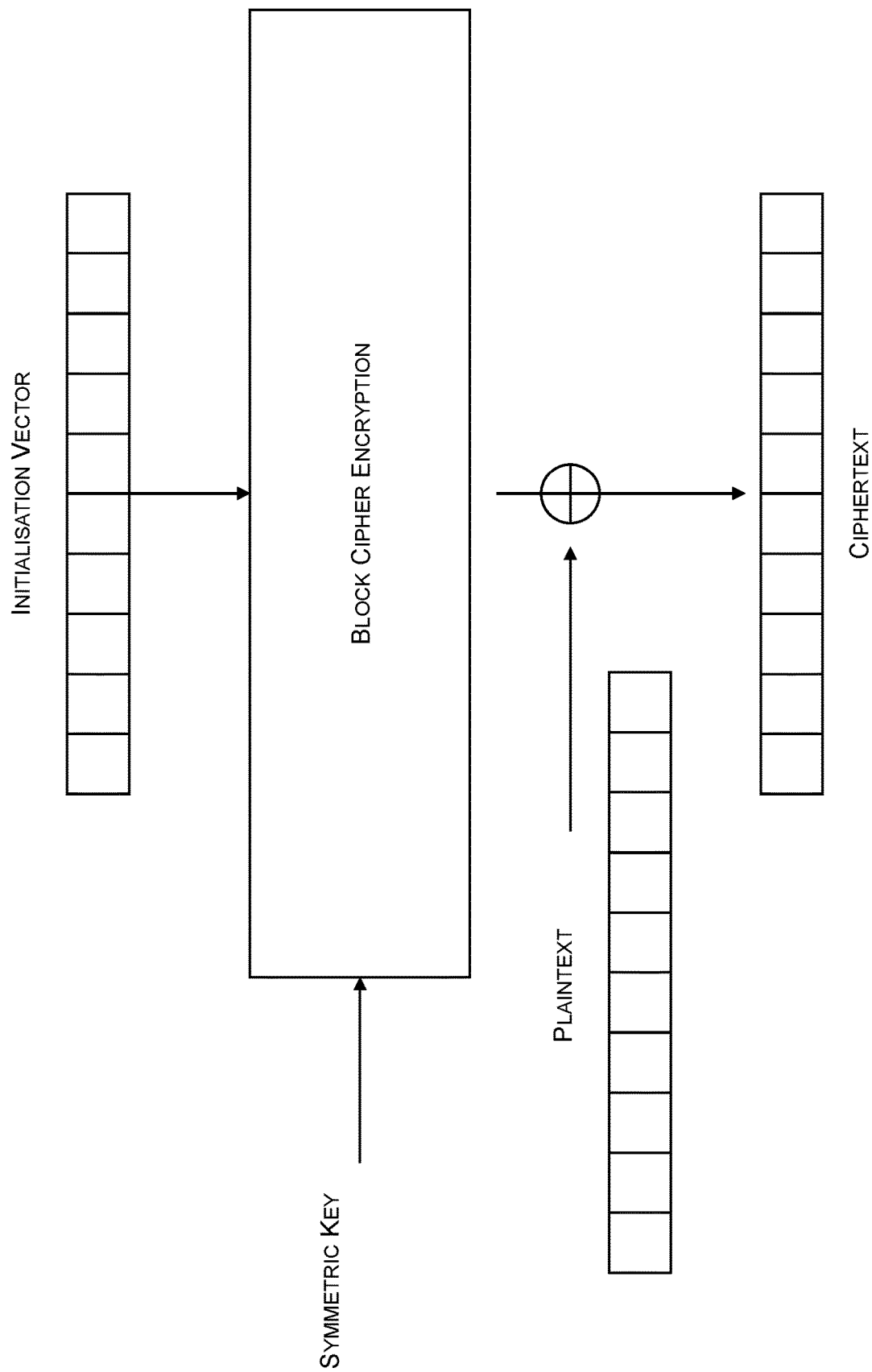
FIG. 12 illustrates an example of the use of an initialization vector.

An initialisation vector may be applied in different ways to produce encrypted data. Reference is made to FIG. 12, which illustrates one example of the use of an initialisation vector. A block of unencrypted data is referred to as a block of plaintext, whereas a block of encrypted data is referred to as a block of ciphertext. As may be observed from FIG. 12, the encryption key is not directly applied to the plaintext. Rather, it is the initialisation vector that is encrypted using the encryption key. The encryption key is a symmetric key. The encrypted Initialisation vector is then XORed with the plaintext to produce the ciphertext. A different initialisation vector would be used in this manner to encrypt each different block of plaintext, thereby hiding patterns in the original data.

Because of the symmetry of the operation shown in FIG. 12, the decryption algorithm is the same as the encryption algorithm. In other words, to obtain the plaintext from the ciphertext, the ciphertext is XORed with the encrypted form of the initialisation vector to obtain the plaintext.

Although FIG. 12 shows an example where the encrypted form of the initialisation vector is XORed with the plaintext, other block cipher modes of operation making use of an initialisation vector may be employed. For example, in another mode of operation, the plaintext may first be XORed with the initialisation vector. The result of the XOR operation then being encrypted using the encryption key to produce the ciphertext.

There are different types of block cipher encryption by which a key may be applied to encrypt data, such as the initialisation vector, as part of a block cipher. One widely used standard for this purpose is the Advanced Encryption Standard.

Therefore, block ciphers provide an effective encryption for large amounts of data that provides confidentiality of the data. In order to ensure integrity and authentication of data, as well as providing a set of encrypted data, a sender may also provide, along with the encrypted data, a message authentication code (MAC). This MAC is calculated using the ciphertext and allows a recipient to determine the sender of the data and to detect any changes to the data.

Embodiments of the application provide a method for guaranteeing freshness for an encryption scheme, enabling a recipient of data to protect against replay attacks, which could be made by an attacker. In other words, a recipient will know if it has the seen the same data more than once. Embodiments provide this by having a processing circuitry that is able to determine an expected initialisation vector of data to be received. The processing circuitry, when it receives data comprising an initialisation vector, is able to determine if the received initialisation vector matches the initialisation vector expected. If not, the data is rejected.

Figure 13:
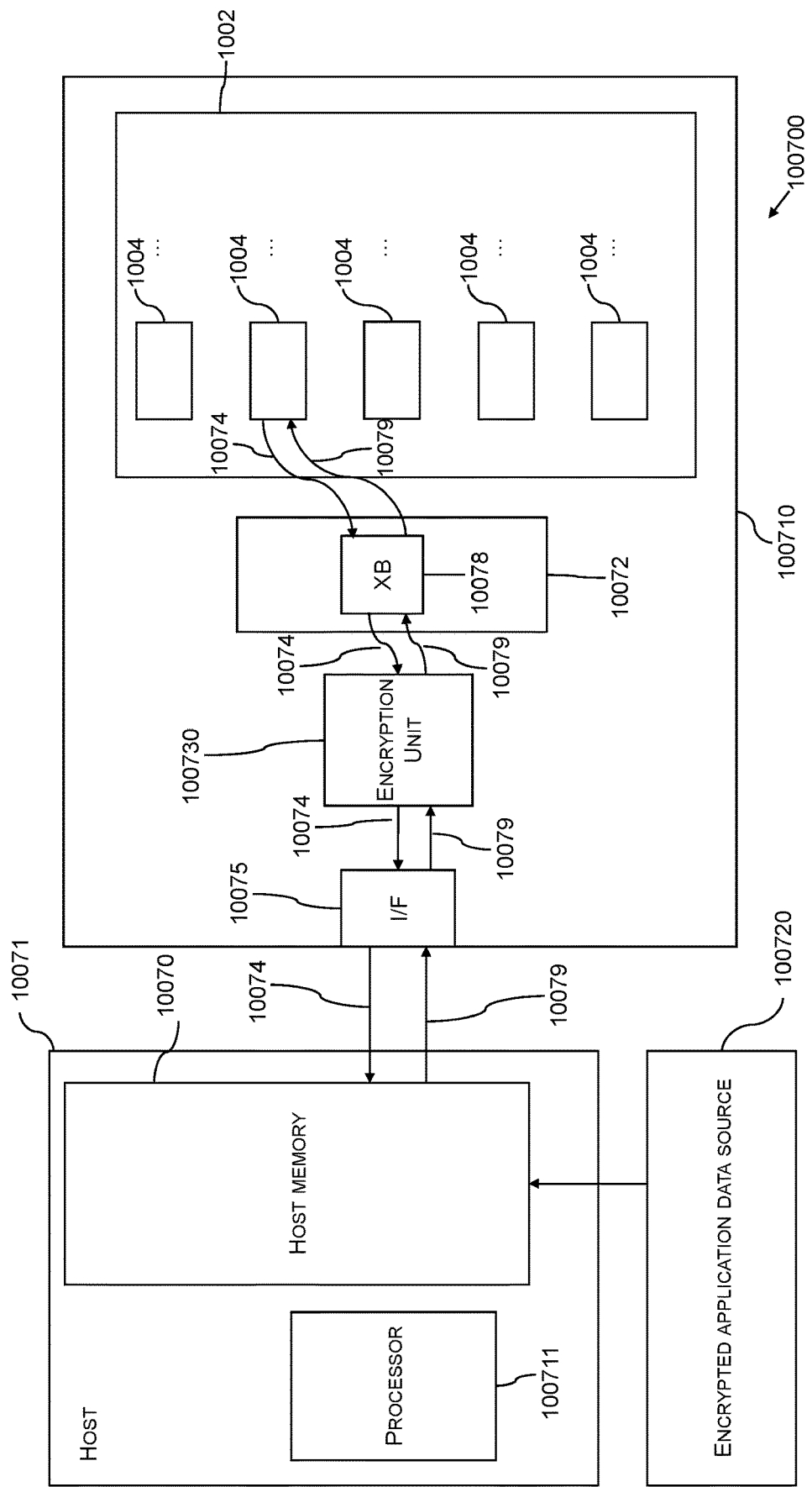
FIG. 13 illustrates an integrated circuit.

Reference is made to FIG. 13, which illustrates an example system 100700 in which embodiments may be implemented. The system 100700 comprises an integrated circuit 100710 of which the multi-tile processing unit 1002 is a part. The multi-tile processing unit is a multi-tile processor comprising tile processors 1004 as discussed. The tiles 1004 are configured to read and write data to a host memory 10070 in host system 10071. The host system 10071 is connected to a data source 100720, which provides the encrypted application data for storage in the host memory 10070. It is this data that is read by the tiles 1004 of the application. Additionally, the tiles write their results of processing to the host memory 10071.

The host system 10071 is untrusted and is unable to decrypt the application data stored in memory 10070. The one or more symmetric keys, which are required to encrypt and decrypt the data, are shared between the application data source 100720 and the integrated circuit 100710. The application data source 100720 is a further data processing system that is configured to communicate with the multi-tile processing unit via the host system 10071. The application data source 100720 provides the compiled executable code that executes on the multi-tile processing unit. Since the host system 10071 is untrusted, the exchange of the application data and results are encrypted before being sent through the host 10071.

All of the tiles 1004 are initially loaded with bootloader code (referred to as a secondary bootloader) that is used to issue read requests to load the executable image from the host memory 10070 into the tiles 1004. A hardware module on the integrated circuit 100710 issues writes at runtime to write the secondary bootloader to the tiles 1004. The tiles 1004 then execute instructions of the secondary bootloader to issue requests to read the executable image from host memory 10070.

Once the executable image has been loaded into the tiles 1004, each of the tiles executes instructions of the image to read application data from the host memory 10070 and write results of processing to the host memory 10070. The application data stored in the host memory 10070, as well as being encrypted using a block cipher encryption scheme is also stored along with the initialisation vectors that were used to encrypt the data. These initialisation vectors were determined by the application data source 100720. The tiles 1004 execute their executable instructions to determine the initialisation vector they expect to receive in response to a read request. When a tile receives data and an initialisation vector in response to a read request, it compares the received initialisation vector to the expected initialisation vector and accepts the received data upon determining a match.

An example of a tile 1004 issuing a read request 10074 is shown in FIG. 13. The read request comprises an address in memory 10070 from which the data is to be read from. The read request 10074 is transmitted from the tile 1004 in a first packet format (referred to as the Tlink format) and received at an exchange block 10078. The exchange block 10078 converts the read request 10074 to a second packet format (referred to as an Elink packet format). The Elink packet format is suitable for transmission to other components of the integrated circuit 100710 outside of the multi-tile processing unit.

The read request 10074 is passed to encryption hardware 100730 that is configured to implement the encryption algorithm. The encryption hardware 100730 may be referred to as a secure exchange pipe (encryption unit) 100730. The encryption unit 100730 performs encryption of data written by the tiles 1004 to the host memory 10070 and decryption of data read from host memory 10070 by the tiles 1004. Although the encryption unit 100730 described with respect to FIGS. 13 to 17 is described as being a single unit, in examples, there may be separate encryption units 100730 provided for encryption and decryption of data. The encryption unit 100730 may perform the encryption and decryption operations according to the advanced encryption standard (AES).

The read requests 10074 are passed from the encryption unit 100730 to the interface 10075. The interface 10075 may be a PCIe complex for converting the read requests to PCIe read requests for dispatch to the host 10071. In some examples, the encryption unit 100730 may be incorporated as part of the interface 10075 rather than being a separate entity as shown in FIG. 13.

The read request 10074 is converted to a third format (e.g. the PCIe read request format) by the interface 10075 and provided to the host 10071. The processor 100711 of the host 10071 processes the read request 10074 by causing one or more read completions 10079 to be generated, the read completions 10079 comprising the data loaded from the region in memory 10070 identified in the read request 10074. This data comprises encrypted application data in the form of a ciphertext block. The data also comprises an associated initialisation vector. The data comprises an associated MAC.

Although in the example of FIG. 13, only one read request 10074 is issued by the respective tile 1004, a plurality of read completions 10079 may be returned by the tiles 1004 in response to the single read request 10074. Together the one or more read completions that are returned in response to a single read request form an encryption frame. An encryption frame (which may also be referred to as an authentication frame) comprises the data of a single ciphertext block that was generated using a single initialisation vector. This encryption frame may be spread out over two or more packets to allow the cost of inclusion of the initialisation vector and the MAC in the encryption frame to be amortised over a larger payload, reducing the overhead of the encryption scheme. In some examples, the total size of the encryption frame in one example may be 128 bytes, with the size of each read completion packet being 64 bytes.

The encryption unit 100730 provides the completions 10079 comprising the decrypted application data to the exchange block 10078. The exchange block 10078 examines the tile identifier contained in the completions and, in dependence upon this identifier, routes the completions to the identified one of the tiles 1004. The exchange block 10078 also converts the packets from the Elink to the Tlink packet format before delivery to the identified one of the tiles 1004.

The relevant tile 1004 receives the completions 10079 and compares at least part of the initialisation vector contained in the completions 10079 to the expected at least part of the initialisation vector as determined by the tile 1004.

The initialisation vector that is stored in the host memory 10070 is defined with reference to the concept of streams. The application data stored in host memory 10070 that may be read from and written to by the tile 1004 is divided into a set of streams. Each stream may for example comprise a sequence of images (individual still images or video frames), or an audio stream of one or more audio samples, or any other sequence of experience data (e.g. online shopping habits, etc.) which is being sent from the host 10071 to the multi-tile processing unit in order for the multi-tile processing unit to use as inputs to a machine learning or machine intelligence algorithm run on the plurality of multi-tile processing unit. For example, this could be to train a neural network based on the streamed data, or to make inferences from the data based on an already-trained neural net. In an example, where the stream is in the direction from multi-tile processing unit to host 10071, the stream could comprise a stream of inferences resulting from a machine intelligence algorithm such as a trained neural net run on the multi-tile processing unit.

Each of the streams may be identified by a stream identifier. The streams do not need to be contiguously arranged in memory 10070 but could be distributed in different memory regions. The data of each stream is divided into different blocks, each block having a block identifier. Each block is read from and written to in a single encryption frame, i.e. each block is associated with a unique initialisation vector.

The computer code instructions in each tile 1004 enable each tile to map the addresses of host memory, from which it reads and writes to, to block and stream identifiers. In other words, the tile 1004 is able to determine, when it reads and writes to a particular address in host memory 10070, the block and stream from which it is reading and writing.

The tile 1004 may determine part of the expected initialisation vector as follows. A first part of the expected initialisation vector identifies the stream from which the data is read from. A second part of the expected initialisation vector identifies the block of the IO stream that is requested. A third part of the expected initialisation vector identifies the tile 1004. The tile 1004 is able to determine all of these components based on the compiled executable image that it received from the application data source 100720, which also provided the encrypted data in host memory 10070. Since the application data source 100720 provides the compiled executable image and the encrypted applications data, it is able to arrange that the tiles 1004 by executing the executable instructions are able to determine the initialisation vectors used to encrypt the encrypted application data.

Figure 14:
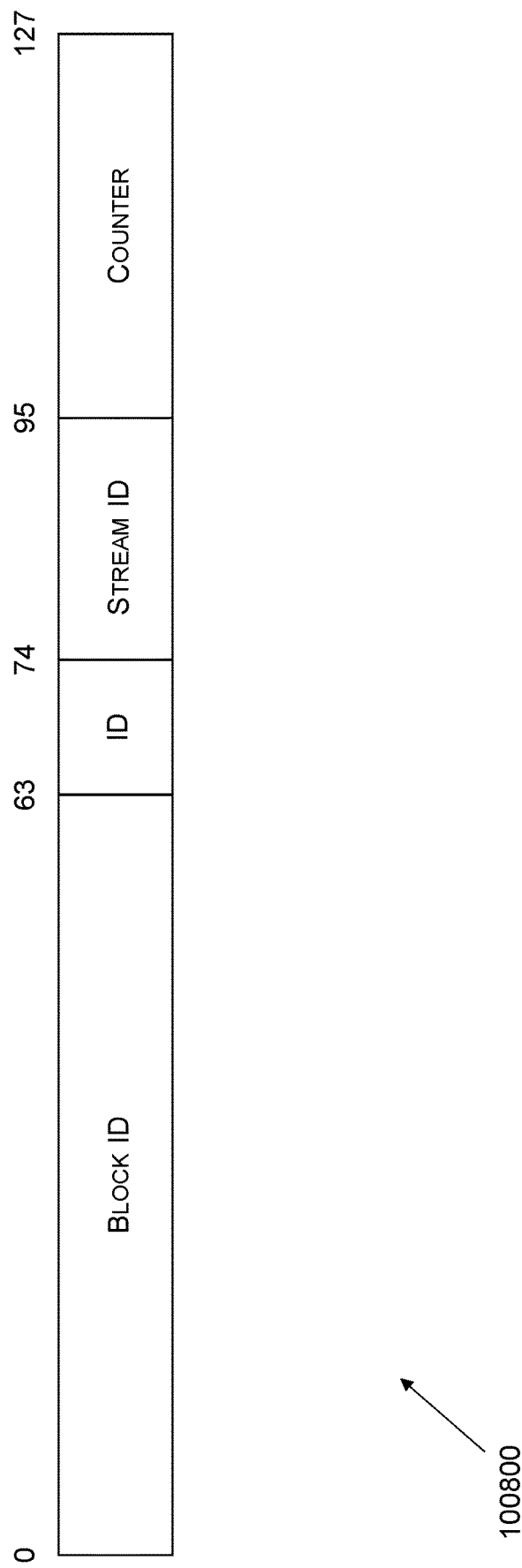
FIG. 14 illustrates components of an initialization vector.

Reference is made to FIG. 14, which illustrates the components of an example initialisation vector 100800. As shown, bits 0:63 of the initialisation vector 100800 comprise the identifier of the requested block within a stream. Bits 63:74 of the initialisation vector 100800 comprise the identifier of the tile 1004. Bits 75:95 of the initialisation vector 100800 comprise the identifier of the stream. Bits 96:127 of the initialisation vector 100800 comprises a counter value. When a tile 1004 receives the 128 bit initialisation vector, the tile 1004 needs only to check the first 96 bits of the initialisation vector 100800. The remaining 32 bits of the initialisation vector 100800 are present so as to ensure that different data is always encrypted and decrypted using a different initialisation vector. As will be described, the tiles 1004 may write to certain blocks of data within the host memory 10070. When they do so, the new block of data should be encrypted with a different initialisation vector. The counter value in the initialisation vector 100800 is updated in this case to ensure that a different initialisation vector is used.

Initially when the application data source 100720 writes the application data to host memory 10070, the counter bits for all the initialisation vectors may be set equal to the same starting value. In embodiments, the starting value may be all zeros. When a tile 1004 overwrites a particular block of data, the counter value changes to a new value such that the updated data is associated with a new initialisation vector. This prevents different data being encrypted using the same initialisation vector.

Figure 15:
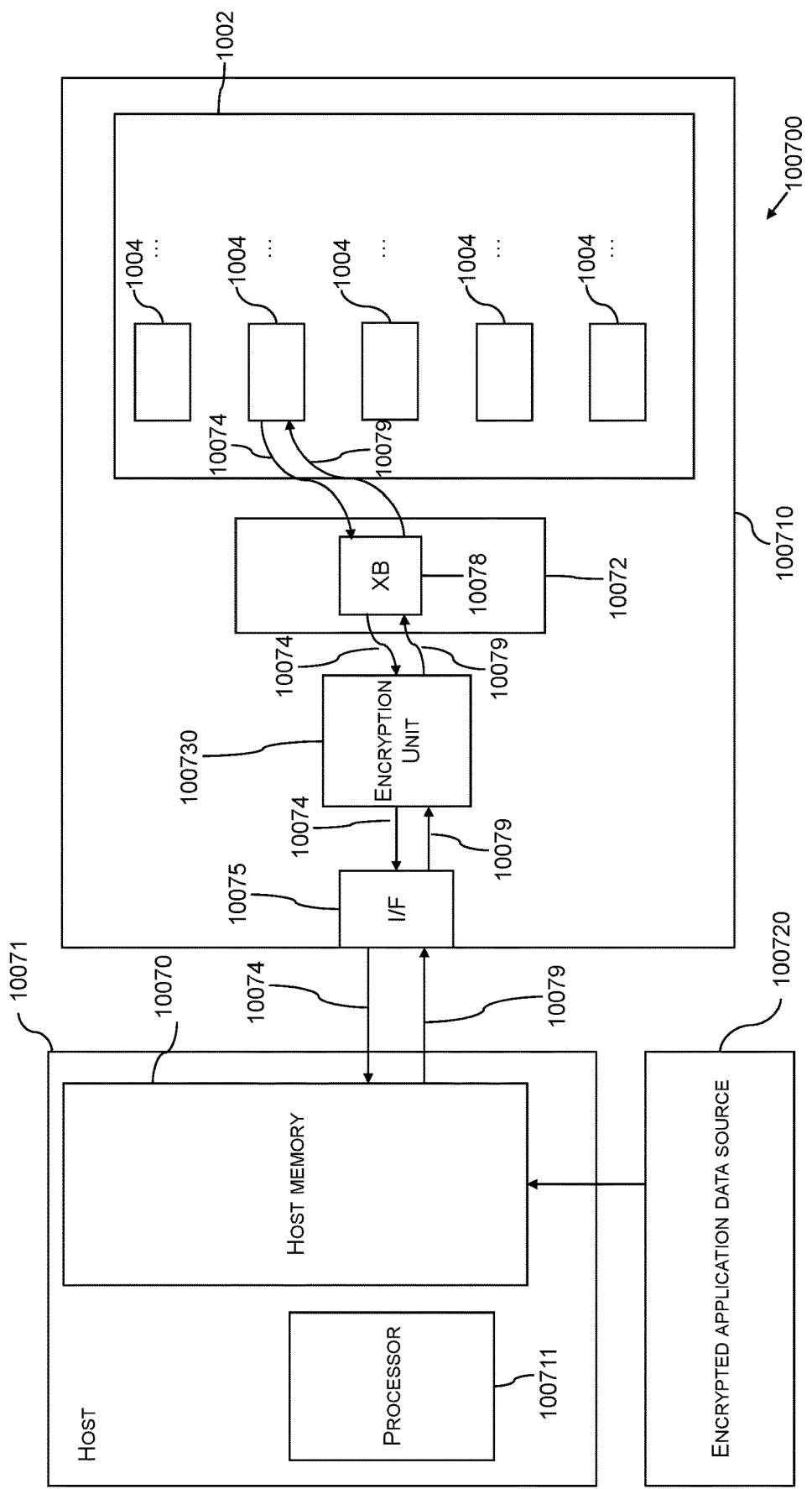
FIG. 15 illustrates how a tile may write data to host memory.

Reference is made to FIG. 15, which illustrates how a tile 1004 may write data to the host memory 10070. One of the tiles 1004 is shown as dispatching one or more write requests 10074. The one or more write requests 10074 together form an encryption frame. As with the read completions described above, the one or more write requests 10074 may comprise a single packet or multiple packets depending upon the size of each encryption frame and the size of the packets. In the case that each write request comprises 64 bits and each encryption frame comprises 128 bits, two write requests will be dispatched to write to a single block of data in host memory 10070. As with the read completions, sending multiple write requests per frame allows the cost of including the initialisation vector and MAC to be amortised over a larger payload. The write requests are dispatched in a given sequence. The last of the write request has a bit (the cc bit) set to indicate to the encryption unit 100730 the last of the packets in the sequence, allowing the encryption unit 100730 to determine the order of the write requests. Alternatively, if there are more than two write requests each write request may have multiple bits allowing the encryption unit 100730 to determine the order.

The data contained in the write requests 10074 is unencrypted. The one or more write requests 10074 include part of the initialisation vector to be used to encrypt the data. The part of the initialisation vector may be first 96 bits of the initialisation vector shown in FIG. 14. This part of the initialisation vector is determined by the tile 1004 that issued the one or more write requests.

The one or more write requests 10074 are in the Tlink packet format. The one or more write requests 10074 are delivered to the exchange block 10078, which converts the one or more write requests 10074 from the Tlink packet format to the Elink packet format. The write requests are then provided to the encryption unit 100730.

The encryption unit 100730 is configured to encrypt the data contained in the one or more write requests 10074. The encryption unit 100730 encrypts this data using an initialisation vector comprising the part of the initialisation vector contained in the one or more write requests 10074 along with a counter value that is supplied by the encryption unit 100730 itself. The encryption unit 100730 maintains one or more counter values, which are incremented when data is written by a tile 1004 to the host memory 10070. In some embodiments, the one or more counter values comprise a different counter for each stream. In some embodiments, the one or more counter values comprise a single counter value for the entire memory 10070. In either case, the encryption unit 100730 increments a suitable counter value upon receipt of one or more write requests 10074 to a block of data in the host memory 10070. The encryption unit 100730, following the updating of the counter value, combines the updated counter value with the part of the initialisation vector received from the tile 1004 in the write requests 10074 to form the full initialisation vector. This initialisation vector is then used to encrypt the data. The encryption unit 100730 also generates a MAC for the data that is included in the one or more write requests 10074.

As noted, in the case that the one or more write requests 10074 comprise two or more write requests, the bits (such as the cc bit) are included in the packets. This enables the encryption unit 100730 to determine the sequence of the packets. The encryption unit 100730 uses this determination of the order to correctly order the data for encryption the data and to store the generated MAC at an appropriate position in the plurality of write requests 10074. For example, whilst the initialisation vector is stored at the start of the payload of the first of the write requests 10074, the encryption unit 100730 may store the MAC at the end of the payload of the last of the write requests 10074.

The encryption unit 100730 sends the one or more write requests 10074 to the interface 10075. The interface 10075 receives the one or more write requests 10074 from the encryption unit 730 and coverts them to PCIe write requests. The interface 10075 causes the requests 10074 to be sent to the host 10071. The host processor 100711 causes the encrypted data to be written to the host memory 10070 at the memory address indicated in the write requests 10074.

Once the data is written to the host memory 10070 that data is available to be read by a tile 1004. The tile 1004 that reads the data could be the same or different to the tile 1004 that wrote the data to host memory 10070. Since all of the tiles 1004 comprise related sets of instructions that are generated together at compile time, even if one tile 1004 wrote a block of data to host memory 10071, another tile 1004 comprises the code required to, when it reads that data from host memory 10071, verify that the initialisation vector is correct. In other words, the tile 1004 that reads the data from host memory 10071 can determine the expected part of the initialisation vector, which is expected to match the part of the initialisation vector written to host memory 10070 by the tile 1004 that issued the write requests 10074.

Figure 16:
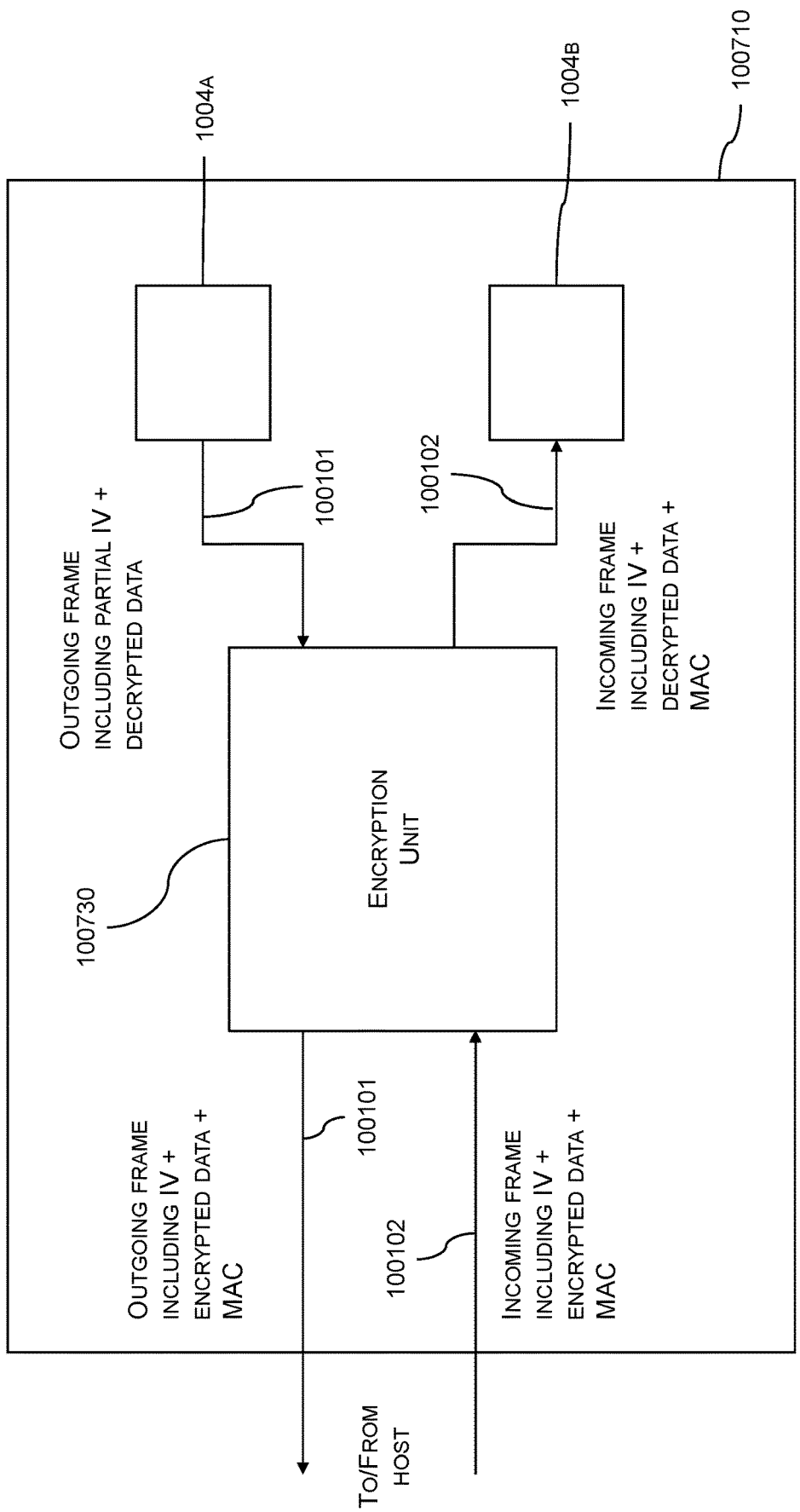
FIG. 16 illustrates an example of movement of data when data is written to host memory.

Reference is made to FIG. 16, which illustrates an example of the movement of data when data is written to host memory 10070 by a tile 1004a and read from host memory 10070 by a tile 1004b. In this example, the tiles 1004a, 1004b are shown as two separate tiles. However, in other examples, the tiles 1004a, 1004b may be the same tile 1004. In the example, the exchange block 10078 is omitted for simplification of the Figure.

The tile 1004a sends one or more write requests 100101 to the encryption unit 100730. The one or more write requests 100101 may be the same as the requests 10074. The one or more write requests 100101 constitute an outgoing frame. The outgoing frame includes the unencrypted data. The outgoing frame from the tile 1004a includes the partial initialisation vector determined by the tile 1004a.

The encryption unit 100730 encrypts the data, completes the initialisation vector by adding the count value and calculates the MAC. The outgoing frame 100101 from the encryption unit 100730 includes the encrypted data, the full initialisation vector and the MAC. The encryption unit 100730 sends the one or more write requests 100101 to the host 10071, which writes these to memory 10070.

In response to a read request from tile 1004b, the host 10071 provides encrypted data in an incoming frame 100102. The incoming frame 100102 is in the form of one or more read completions 100102. The incoming frame 100102 includes the content of the outgoing frame 100101 sent by the encryption unit 100730, i.e. it includes the initialisation vector and the MAC in addition to the encrypted data. The incoming frame 100102 is provided to the encryption unit 100730. The encryption unit 100730 decrypts the data using the initialisation vector in the frame 100102 and checks the MAC. If the MAC is determined to be correct, the frame 100102 is provided to the tile 1004b.

The tile 1004b checks that part of the initialisation vector is as expected. The tile 1004b does not require the MAC and, therefore, deletes the MAC. The tile 1004b stores the decrypted data in its memory in response to determining that the part of the initialisation vector is as expected.

Although the above embodiments have described the storage 10070 that is read from and written to as being host storage, the storage need not be host storage, but could be another type of storage external to the tiles 1004.

Figure 17:
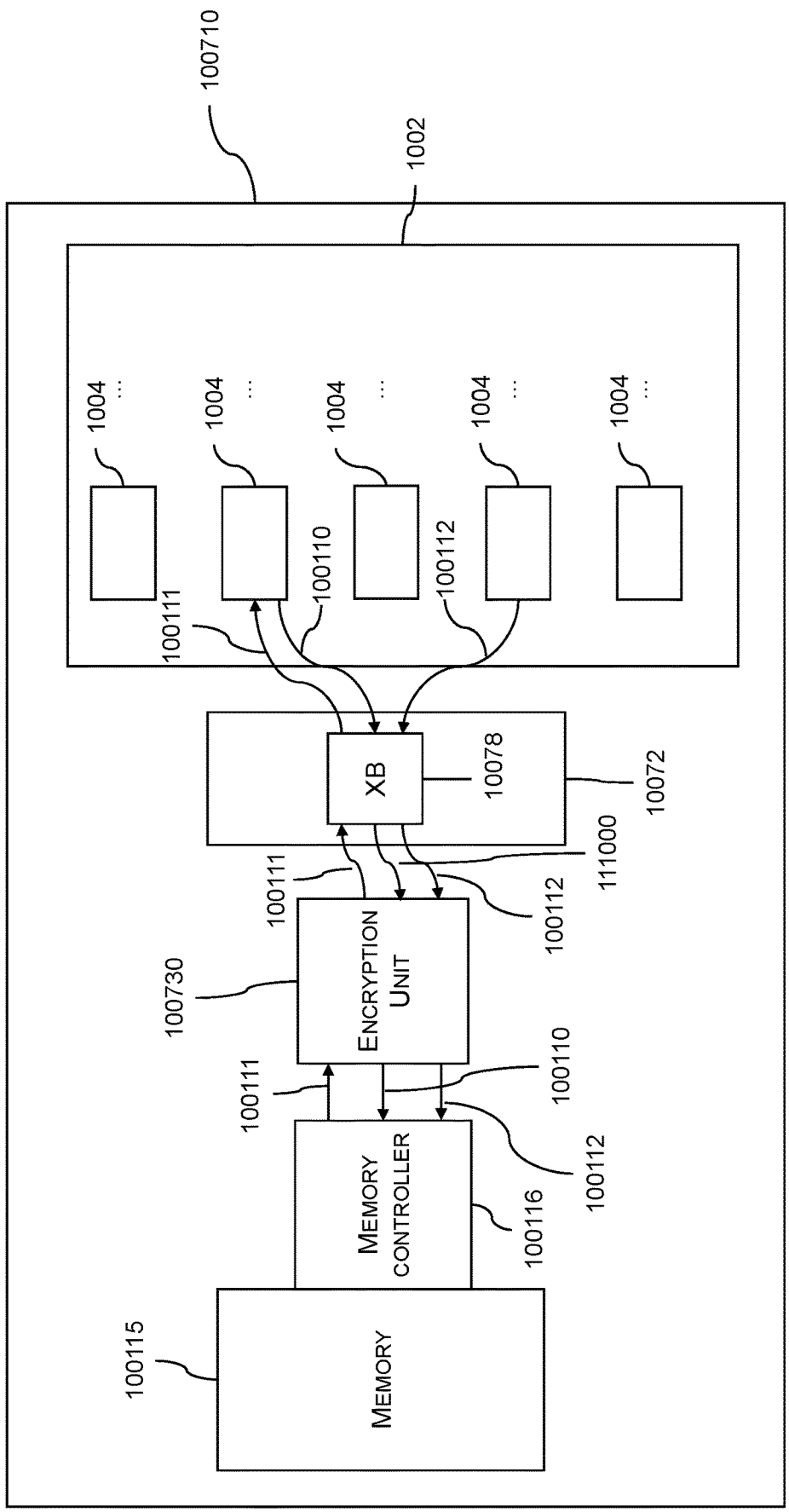
FIG. 17 illustrates an example of tiles writing to and reading from a memory that is part of an integrated circuit.

Reference is made to FIG. 17, which illustrates an example of tiles 1004 writing to and reading from a memory 100115 that is part of the integrated circuit 100710. The memory 100115 may be a DRAM. The memory 100115 is configured to store encrypted application data that may be read and written by the tiles 1004. The memory 100115 therefore is used in the same manner as the host memory 10070 discussed above and stores data in different streams, with each stream comprising multiple blocks, each with a corresponding initialisation vector.

One of the tiles 1004 is shown sending a read request 100110 and receiving in response, one or more read completions 100111. The read request 100110 and read completions 100111 may have the same features as the read request 10074 and one or more read completions 10079 discussed above with respect to FIG. 13 and may processed in the same way by the exchange block 10078 and the encryption unit 100730. However, in this case, the encryption unit 100730 after processing the read request 100110, causes the read request 100110 to be dispatched to the memory controller 100116 of storage 100115 (rather than the host 10071). In response the memory controller 100116 produces the one or more read completions 100111 to be returned to the encryption unit 100730.

In the example of FIG. 17, the read request 100110 and one or more read completions 100111 need not be converted to/from PCIe, but the memory controller 100116 may be configured to process packets in the Elink format.

Another of the tiles 1004 in FIG. 17 is shown issuing a write request 100112. The write request 100112 may have the same features as the write request 100112 discussed above with respect to FIG. 15 and may processed in the same way by the exchange block 10078 and the encryption unit 100730. However, in this case the encryption unit 100730, after processing the write request 100112, causes the write request 100112 to be dispatched to the memory controller 100116 of memory 100115 (rather than the host 10071).

In response, the memory controller 100116 causes the data of the write request 100112 to be written to the addresses location in the memory 100115.

In the example of FIG. 17, the tiles 1004 perform the same processes for generating and checking the initialisation vector as in the examples of FIGS. 13 to 16.

The checking of initialisation vectors may also be used for ensuring freshness of data transmitted between two multi-tile processing units. In this case, the checking of the initialisation vector is performed by the encryption unit, rather than by the tiles 1004.

Figure 18:
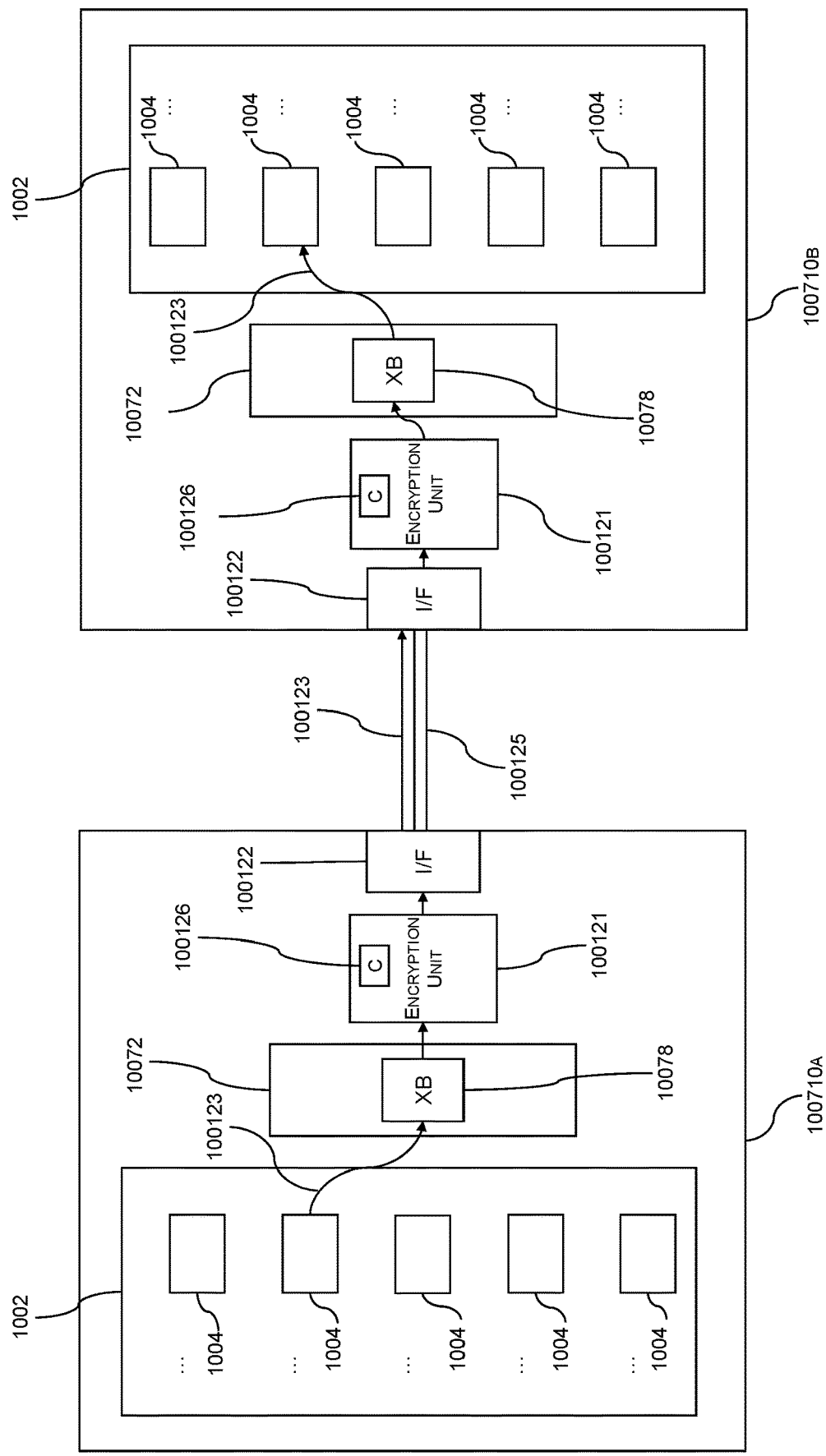
FIG. 18 illustrates an example of communication between two integrated circuits.

Reference is made to FIG. 18, which illustrates an example of communications between two integrated circuits 100710a, 100710b. The integrated circuits 100710a, 100710b each comprise a multi-tile processing unit. The integrated circuits 100710a, 100710b may comprise the same features as the integrated circuit 100710 described above with respect to FIGS. 13 to 17.

The integrated circuits 100710a, 100710b are configured to communicate over a link 100125 between the integrated circuits 100710a, 100710b. The link 100125 is a point to point communication link, such that the number of data packets sent by one of the integrated circuits 100710a, 100710b is the same as the number received at the other of the integrated circuits 100710a, 100710b. The point to point nature of the communication link 100125 allows the encryption units 100121 to each employ a counter to determine the expected initialisation vector to be received with the encrypted data.

FIG. 18 shows a tile 1004 sending one or more write requests 100123. The write requests 100123 produced by the tile 1004 comprise unencrypted data. The write requests 100123 produced by the tile 1004 do not comprise an initialisation vector. In its header, each write request 100123 comprises a destination identifier identifying one of the tiles 1004 on the integrated circuit 100710b to which the data is to be delivered. The write requests 100123 correspond to a single encryption frame for which data to be written will be encrypted using a single initialisation vector. The one or more write requests 100123 may comprise one or multiple packets. In the case that the one or more write requests 100123 comprises multiple packets, the tile 1004 sets one or more bits in the packets (e.g. the cc bit in the last of the packets), so that that the encryption unit 100121 may use the bit to determine which packet in the sequence is the final packet in the sequence.

The write request 100123 is in the Tlink packet format. The write request 100123 is delivered to exchange block 10078. The exchange block 10078 converts the packet/s from the Tlink packet format to the Elink packet format. The exchange block 10078 forwards the converted packet/s to the encryption unit 100121.

In some examples, each integrated circuit 100710a, 100710b comprises separate encryption units, at least one encryption unit 730 for communication with storage (e.g. host memory 10070 or on-chip memory 100115) and at least one encryption unit 121 for communication with the other integrated circuit 100710a, 100710b. In other examples, one encryption unit may be used for both types of communication.

FIG. 18 shows that each of the two encryption units 100121 on the integrated circuits 100710a, 100710b comprise a counter value 100126. The counter values 100126 are initialised to the same value prior to communications between the two multi-tile processing units over link 100125. The counter values 100126 are both incremented when data is transferred over the link 100125 such that the counter values 100126 remain synchronised with one another. The counter values 100126 are used to produce the initialisation vectors, thereby allowing each encryption unit 100121 to predict the initialisation vector received in a frame from the other encryption unit 100121.

The encryption unit 100121 on integrated circuit 100710a comprises a counter 100126, whose value is incremented for every frame of data received and every frame of data sent over the link 100125. When the encryption unit 100121 receives the write requests 100123, the encryption unit 121 updates the value of the counter 100126. The incremented value of the counter 100126 provides the initialisation vector to be used to encrypt the data contained in the write requests 100123. The counter value may be 128 bits in length, providing a 128 bit initialisation vector.

The initialisation vector that is obtained from the counter 100126 is used to encrypt the data of the write requests 100123. The encryption unit 121 also calculates from the encrypted data, a MAC. The encryption unit 100121 updates the write requests 100123 to include the MAC and the initialisation vector. The encryption unit 100121 forwards the write requests 100123 to the interface 100122.

Different protocols could be used for the communication link 100125. The link 100125 may be an Ethernet link 100125, with the interface 100122 comprising an Ethernet protocol stack configured to convert the write request packets 100123 to Ethernet packets. In some examples, the interface 100125 could be a PCIe link, with the interface 100122 being configured to convert the write request packets 100123 to PCIe write requests. In either case, the link 100125 is a point to point link. The interface 100122 causes the write requests 100123 to be sent over the link 100125 to the interface 100122 of integrated circuit 100710b.

The interface 100122 of integrated circuit 100710b receives the write requests 100123. The interface 100122 converts the write requests 100123 to the Elink packet format. The interface 100122 passes the one or more write requests 100123 to the encryption unit 100121. The encryption unit 100121 of circuit 100710b also comprises a counter 100126. Upon receipt of the one or more write requests 100126, the encryption unit 121 increments the value of its counter 100126. Following the update of the counter value 100126, the value 100126 should match the initialisation vector in the received one or more write requests 100126. If the encryption unit 100121 determines that there is no match, then the one or more write requests are treated as a possible replay attack and may be discarded. If the encryption unit 100121 determines that there is a match, then the encryption unit 100121 uses the initialisation vector to decrypt the encrypted data. The encryption unit 100121 also checks the MAC. If the checks are passed, the encryption unit 100121 forwards the one or more write requests 100123 comprising the decrypted data to the exchange block 10078.

The exchange block 10078 converts the one or more write requests 100123 to the Tlink packet format. The exchange block 10078 sends the one or more write requests 100123 to the tile 1004 identified in those requests. The tile 1004 receives those one or more write requests and stores the decrypted data in its memory.

Figure 19:
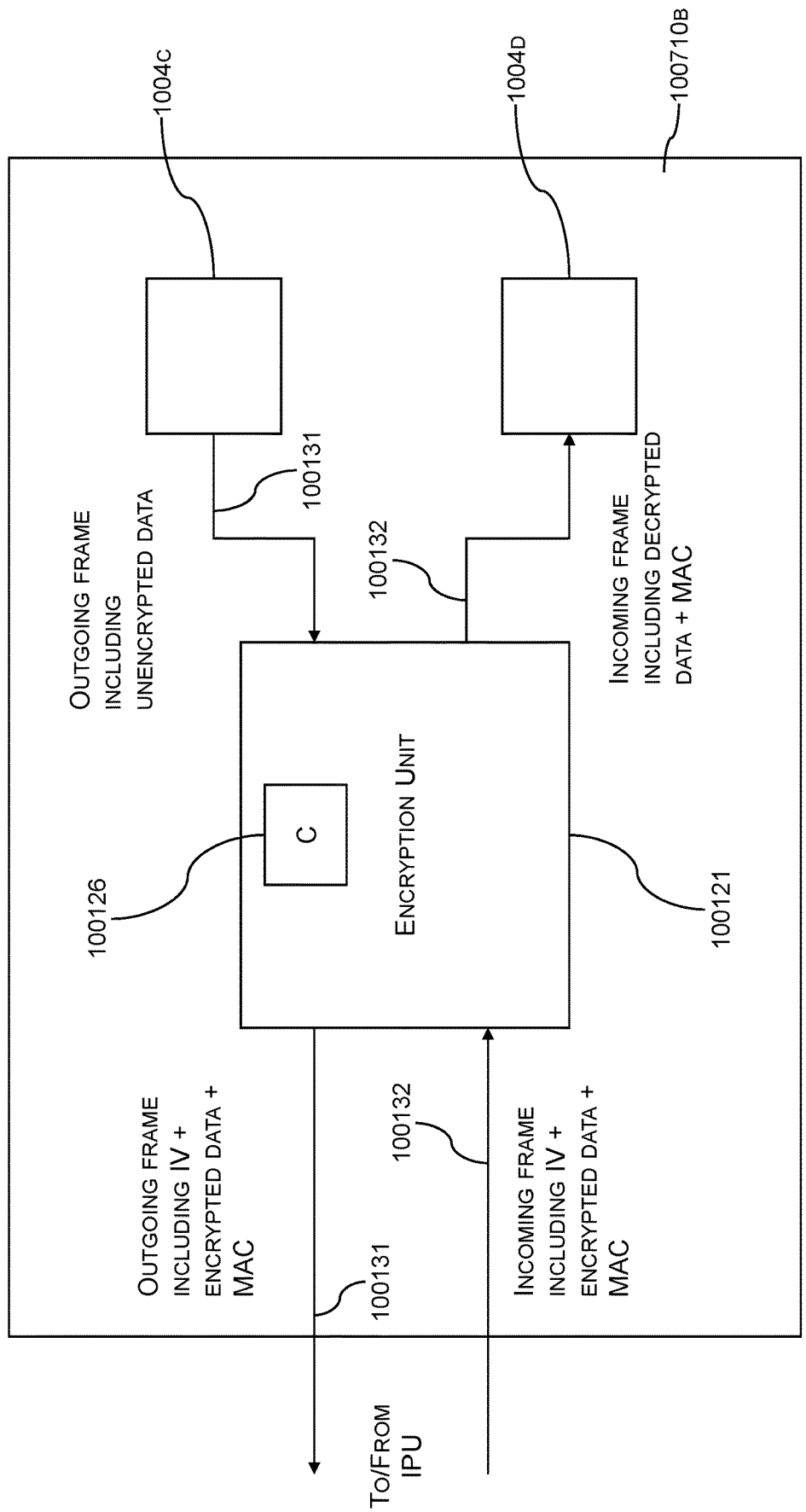
FIG. 19 illustrates an example of movement of data within an integrated circuit.

Reference is made to FIG. 19, which illustrates an example of the movement of data within the integrated circuit 100710*b* when data is written to a tile 1004 on another multi-tile processing unit by a tile 1004*c* and received from another tile 1004 on another processing unit by a tile 1004*d*. In this example, the tiles 1004*c*, 4d are shown as two separate tiles. However, in other examples, the tiles 1004*c*, 1004*d* may be a single tile. In the example, the exchange block 10078 is omitted for simplification of the Figure.

The tile 1004*c* sends one or more write requests 100131 to the encryption unit 100121. The one or more write requests 100131 constitute an outgoing frame. The outgoing frame includes the unencrypted data.

The encryption unit 100121 increments the count value 100126 to produce the initialisation vector and uses this initialisation vector to encrypt the data. The encryption unit 100121 also calculates the MAC. The outgoing frame 100101 from the encryption unit 100121 includes the encrypted data, the initialisation vector and the MAC. The encryption unit 100121 causes the one or more write requests 100101 to be sent to the other multi-tile processing unit.

FIG. 19 also shows one or more write requests 100132 being received from the other multi-tile processing unit. The write requests 100132 are targeting the tile 1004*d* on the integrated circuit 100710*b*. These incoming write 100132 requests include the encrypted data and the initialisation vector used by the other multi-tile processing unit to decrypt the data.

The incoming frame 100132 is provided to the encryption unit 100121. The encryption unit 100730 increments the counter value 100126 to generate an updated counter value. The encryption unit 100121 compares this updated counter value 100126 to the initialisation vector to determine if there is a match. If there is match, the encryption unit 121 decrypts the data using the initialisation vector in the frame 100132 and checks the MAC. If the MAC is determined to be correct, the frame 100132 is provided to the tile 1004*d*. The frame v132 provided to the tile 1004*d* may include the MAC, but since the tile 1004*d* does not require the MAC, the tile 1004*d* deletes the received MAC value.

Although FIGS. 18 and 19 shown only one encryption unit 100121 on each integrated circuit 100710*a*, 100710*b*, in examples there may be two encryption unit s 100121 on each circuit 100710*a*, 100710*b*, one for each direction of transfer.

Figure 20:
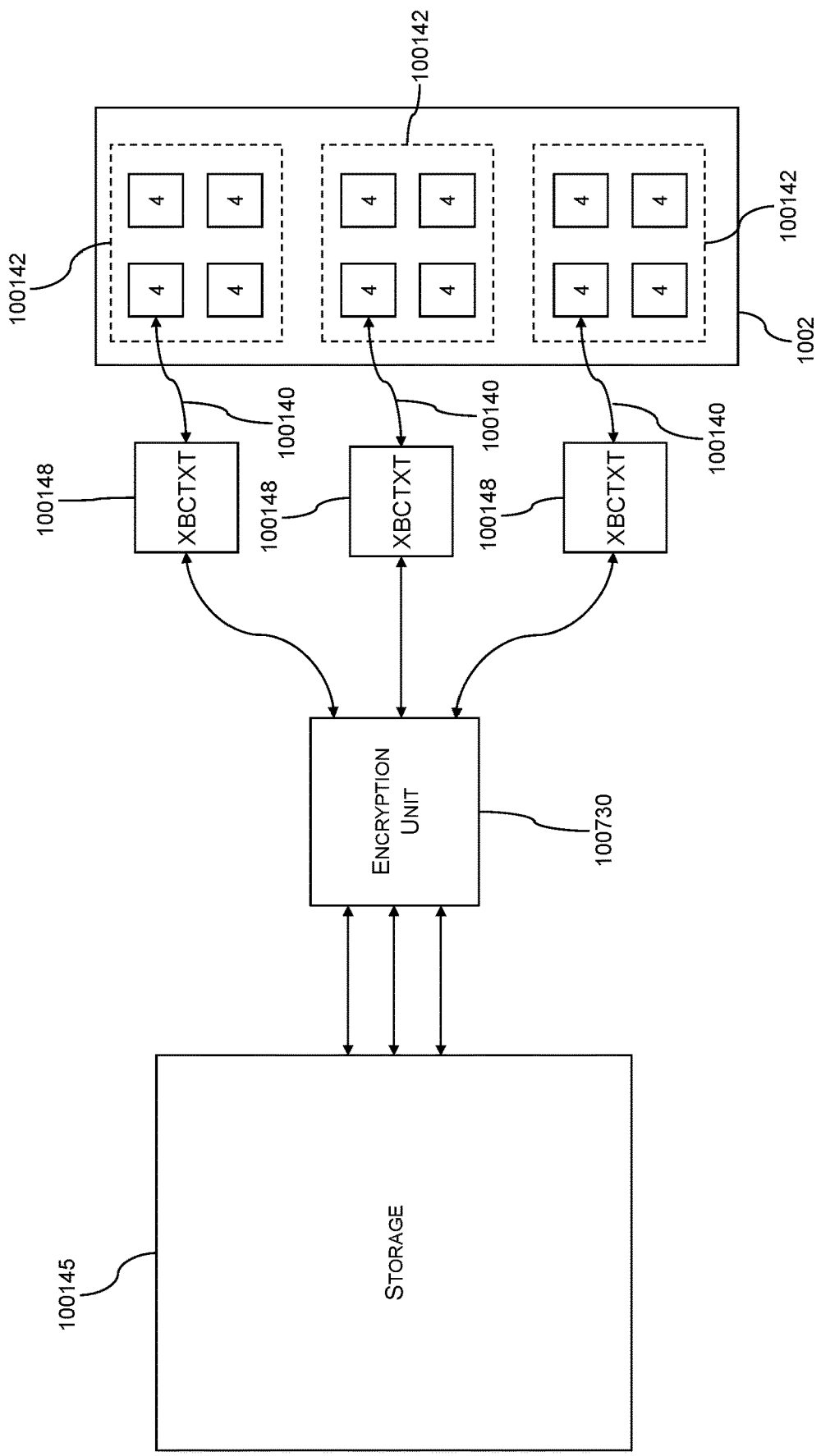
FIG. 20 illustrates how multiple read or write requests issued by different tiles may be outstanding at any one time.

Reference is made to FIG. 20, which illustrates how multiple read or write requests 100140 issued by different tiles 1004 may be outstanding at any one time. Each of the tiles 1004 can only issue one read or write request 100140 at a time. If a tile 1004 has issued a read or write request, it requires further permission from its associated exchange block 10078 before issuing another read or write request.

The read or write requests 100140 issued by the tiles 1004 are requests to read or write to or from the storage 100145. The storage 100145 may be the host memory 10070 shown in FIGS. 13 and 18 or could be the memory 100115 shown in FIG. 17.

Reference is made to FIG. 20, which illustrates an example of the encryption unit 100730 that may be used in examples of the application. The encryption unit 100730 comprises a pipeline that may be used for decrypting data (e.g. in read completions) or for encrypting data (e.g. in write requests). In examples, separate encryption units 100730 may be provided for encryption and decryption.

As shown, the encryption unit 100730 comprises encryption circuitry 100151 that may be used for performing the encryption of data in received packets of an encryption frame. In this case, the encryption circuitry 100151 is responsible for generating the ciphertext from plaintext. The encryption circuitry 100151 may also be responsible for decrypting data by generating the plaintext from the ciphertext.

The encryption unit 100730 also comprises MAC generation circuitry 100152 for generating the MAC for a frame. When unencrypted data is received at the encryption unit 100730 for encryption, the generated MAC is inserted into a packet of the frame. When encrypted data is received at the encryption unit 100730, the MAC generation circuitry 100152 is responsible for checking the MAC in the frame to determine whether or not the MAC in the frame is as expected.

The encryption unit 100730 also comprises pipeline control circuitry 100153 that controls the encryption/decryption circuitry 100151 and MAC generation circuitry to perform their required operations. The control circuitry 100153 controls the supply of data from the incoming frames to appropriate processing circuits within the encryption/decryption circuitry 100151 and the MAC generation circuitry 100152. The control circuitry 100153 also loads certain state information from the state store 100154 for provision to the encryption circuitry 100151 and the MAC generation circuitry 100152. This state information is stored in latches 100156, 100157 associated with each circuit 100151, 100152.

Suppose a write request data packet is received at the encryption/decryption circuitry 100151. The write request is received from a tile 1004 and is a request to write to a certain location in storage 100145. This write request comprises a first packet of an encryption frame. The data requires encryption by the circuitry 100151. The circuitry 100151 performs certain operations to generate the encrypted data. These operations may include the encryption of the initialisation vector and the XOR operations between corresponding bits of the encrypted initialisation vector and the plaintext. However, since the full plaintext is not yet received (since only the first packet of the frame is received), the full ciphertext cannot be produced. The partially generated ciphertext and encrypted initialisation vector may constitute state information associated with the frame.

Similarly the MAC generation circuitry 100152 may perform some of the operations to generate part of the MAC, but is unable to complete these operations until the full frame is received. State information associated with the MAC generation is generated as part of the process performed by the MAC generation circuitry 100152 with respect to the first packet of the frame.

If the next packet received at the encryption unit 100730 does not belong to the same encryption frame as the first write request packet discussed above, the pipeline control circuitry 100153 saves the state information associated with the first frame to the state store 100154 and performs processing for the next packet. When at a later time, remaining packets belonging to the first frame are scheduled for processing by the encryption unit 100730, the pipeline control circuitry loads the state information associated with the first frame from the state store 100154. The circuitry 100151 uses the state information associated with the first frame to complete the encryption process. The MAC generation circuitry 100152 uses the state information to complete the MAC generation process.

Figure 21:
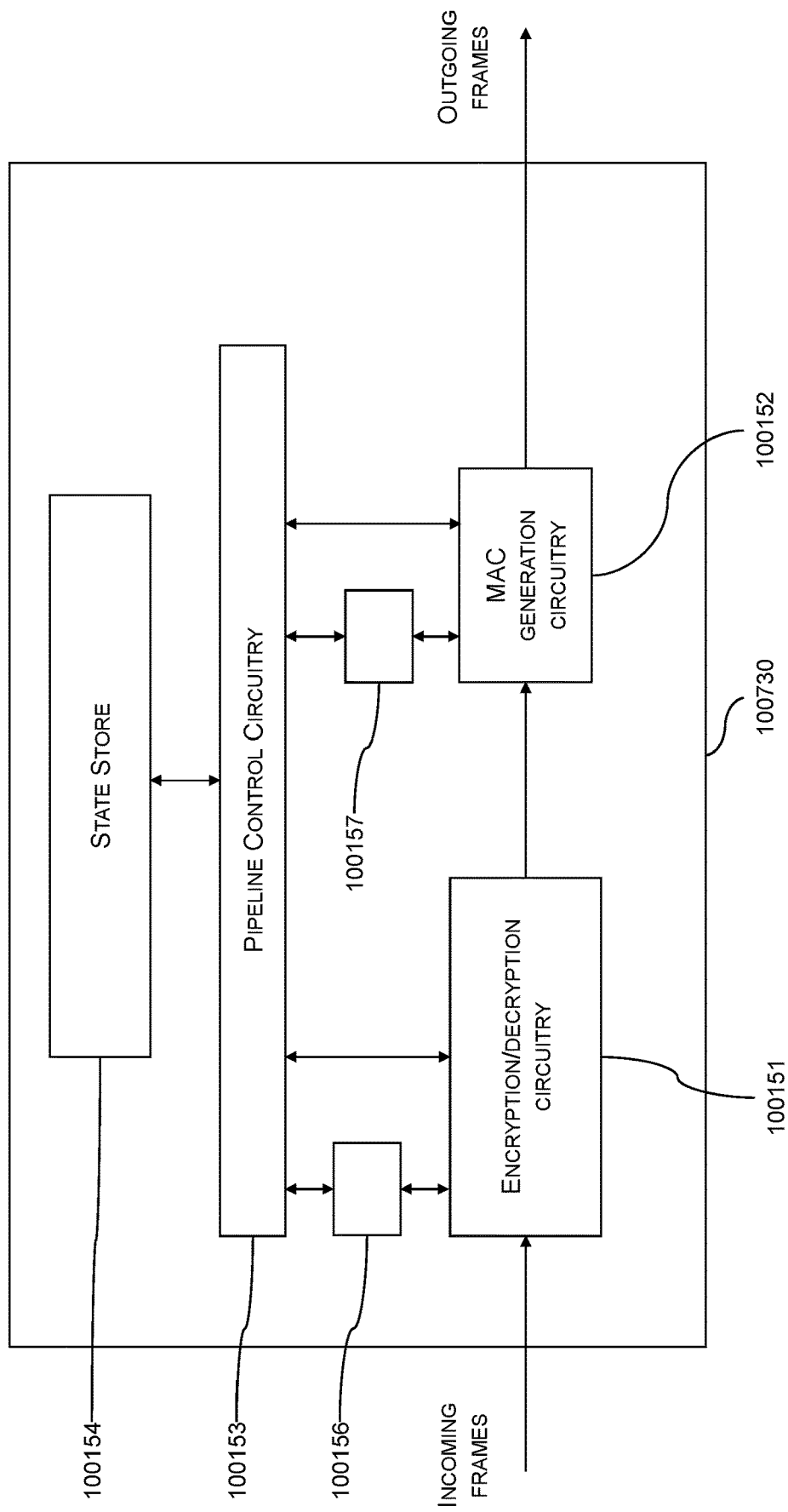
FIG. 21 illustrates an example of an encryption unit.

A similar process may be carried out in the case that the encryption unit 100730 shown in FIG. 21 is used for decryption of data provided from the storage 100145 to the tiles 1004. In examples, separate encryption units 100730 are provided for decryption and encryption of data.

In the case of decryption of data, if a read completion is received at the encryption unit where that read completion is the first packet of an encryption frame, certain state information may be generated by the decryption circuitry 100151 and by the MAC generation circuitry 100152 when processing the read completion. The state information generated by the circuitry 100151 may comprise an encrypted initialisation vector. The state information generated by the circuitry 100151 may comprise part of the plaintext for the frame. The state information generated by the circuitry 100151 may comprise state information associated with generation of the MAC.

If the next packet received at the encryption unit 100730 does not belong to the same encryption frame as the first read completion discussed above, the pipeline control circuitry 100153 saves the state information associated with the frame to the state store 100154 and performs processing for the next packet. When at a later time, remaining packets belonging to the frame comprising the first read completion is scheduled for processing by the encryption unit 100730, the pipeline control circuitry loads the state information associated with the first frame from the state store 100154. The circuitry 100151 uses the state information associated with the packet to complete the decryption process. The MAC generation circuitry 100152 uses the state information to complete the MAC generation process.

The arrangement of the pipeline in the encryption unit 100730 may effectively reduce the latency associated with processing a data packet where it is required to load state information to do so. One approach could be to load of all the state information into a RAM when the packet is scheduled for processing. However, loading all of the state information before commencing processing may introduce an unnecessary delay in processing. Therefore, according to examples separate latches 100156, 100157 are provided for the encryption/description circuitry 100151 and the MAC generation circuitry 100152. When a packet is scheduled for processing, the control circuitry 100153 loads the state information required for encryption/decryption processing by the circuitry 100151 into the latch 100156. The circuitry 100151 then commences the encryption/decryption processing. The control circuitry 100153 loads the state information required for the processing by MAC generation circuitry 100152 into latch 100157, such that that state is available to be used for the MAC generation/checking processing by circuitry 100152 when the output of the circuitry 100151, e.g. the ciphertext, become available. Hence the overall time to process a data packet in the pipeline of encryption unit 100730 is reduced.

Any range or device value given herein may be extended or altered without losing the effect sought, as will be apparent to the skilled person.

The systems described for implementing embodiments of the disclosure comprise data processing apparatus and functions that may be provided by means of one or more data processors. The different components of the integrated circuit, such as the encryption unit, may be provided by such data processors. The data processors may be of any type suitable to the local technical environment, and may include one or more of, microprocessors, application specific integrated circuits (ASIC), field programmable gate arrays (FPGAs) and processors based on multi core processor architecture, as non-limiting examples. The data processing may be distributed across several data processing modules. Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

Concept A—External Memory Communication

Clause AA, A device comprising: a processing unit; and
at least one encryption unit comprising processing circuitry;
wherein the processing unit comprises a processor comprising an execution unit and at least one memory, the at least one memory storing at least part of an expected initialisation vector associated with data in storage external to the processor, wherein the at least one execution unit is configured to execute computer readable instructions to cause issuance of a read request for the data in storage external to the processor,
wherein the processing circuitry of the at least one encryption unit is configured to:
receive at least one read completion corresponding to the read request, the at least one read completion comprising a ciphertext and an initialisation vector; and
decrypt the ciphertext using the initialisation vector to produce a plaintext; and provide the plaintext and at least part of the initialisation vector to the processing unit, wherein the processing unit is configured to:
compare the at least part of an expected initialisation vector to the at least part of the of the initialisation vector; and
in response to determining that the at least part of an expected initialisation vector matches the at least part of the of the initialisation vector, accept the received plaintext.

Clause AB, A device as in clause AA, wherein the processing unit is a subsystem for acting as a work accelerator to a host system coupled to the device, wherein the storage external to the processor is memory of the host system.

Clause AC, A device as in clause AB, wherein the processor of the processing unit is configured to receive from the host at least part of the computer readable instructions.

Clause AD, A device as in clause AA, wherein the device comprises a memory external to the processing unit, wherein the storage external to the processor is the memory external to the processing unit.

Clause AE, A device as in clause AD, wherein the memory external to the processing unit is a dynamic random access memory.

Clause AF, A device as in any of clauses AA to AE, wherein the device is an integrated circuit.

Clause AG, A device as in any of clauses AA to AF, wherein the processing unit comprises a further processor comprising a further at least one execution unit, the further at least one execution unit is configured to, prior to the issuance of the read request, execute computer readable instructions to cause issuance of at least one write request of the data to the storage external to the processor, the write request comprising the plaintext and at least part of the initialisation vector,
wherein processing circuitry of the at least one encryption unit is configured to: receive the at least one write request;
encrypt the plaintext of the write request using the initialisation vector to produce the ciphertext; and
cause the ciphertext and initialisation vector to be written to the storage external to the processor.

Clause AH, A device as in clause AE, wherein the at least part of the initialisation vector consists of part of the initialisation vector, wherein the processing circuitry of the at least one encryption unit is configured to:
prior to encrypting the plaintext, complete the initialisation vector by updating a counter and adding the updated counter value to the part of the initialisation vector.

Clause AI, A device as in any of clauses AA to AH, wherein the at least part of the expected initialisation vector comprises at least one of:
an identifier of the processor;
a stream of data from which the read request is targeting to read from; and a block of data from which the read request is targeting to read from.

Clause AJ, A device as in any of clauses AA to AI, wherein the at least one read completion comprises a message authentication code, wherein the processing circuitry of the at least one encryption unit is configured to check that the message authentication code matches an expected message authentication code for the read requested data.

Clause AK, A device as in any of clauses AA to AJ, wherein the decryption of the ciphertext using the initialisation vector is performed according to the advanced encryption standard.

Clause AL, A method implemented in a device comprising a processing unit comprising a processor, the method comprising:
storing in the processor at least part of the expected initialisation vector associated with data in storage external to the processor;
causing issuance of a read request for the data in storage external to the processor, receiving at least one read completion corresponding to the read request, the at least one read completion comprising a ciphertext and an initialisation vector; and
decrypting the ciphertext using the initialisation vector to produce a plaintext; and providing the plaintext and at least part of the initialisation vector to the processor, comparing, at the processor, the at least part of an expected initialisation vector to the at least part of the of the initialisation vector; and
in response to determining that the at least part of an expected initialisation vector matches the at least part of the of the initialisation vector, accepting the received plaintext.

Clause AM, A computer program for execution by a processor of a processing unit of a device to perform a method, the method comprising:
storing in the processor at least part of the expected initialisation vector associated with data in storage external to the processor;
causing issuance of a read request for the data in storage external to the processor, receiving at least one read completion corresponding to the read request, the at least one read completion comprising a plaintext and at least part of the initialisation vector;
comparing the at least part of an expected initialisation vector to the at least part of the of the initialisation vector; and
in response to determining that the at least part of an expected initialisation vector matches the at least part of the of the initialisation vector, accepting the received plaintext.

Clause AN, A non-transitory computer readable medium comprising a computer program as in clause AM.

Concept B—any Memory Communication

Clause BA, A device comprising processing circuitry configured to: determine an expected at least part of an initialisation vector for an encryption frame, the encryption frame comprising ciphertext and an initialisation vector used to generate the ciphertext;
compare at least part of the initialisation vector of the encryption frame to the at least part of the expected initialisation vector; and
in response to determining a match between the at least part of the initialisation vector in the encryption frame and the expected at least part of the initialisation vector, cause a plaintext generated by decrypting the ciphertext to be stored in a memory of a processor of the data processing system.

Clause BB, A device as in clause BA, wherein the processing circuitry comprises at least one execution unit of the processor configured to execute computer readable instructions to perform the step of determining the expected at least part of the initialisation vector for the encryption frame,
wherein the at least one execution unit is configured to execute the computer readable instructions to issue a read request to read the encryption frame from a storage external to the processor, wherein the device comprises at least one encryption unit comprising circuitry configured to:
receive the encryption frame in at least one read completion corresponding to the read request;
decrypt the ciphertext to produce the plaintext using the initialisation vector in the encryption frame; and
provide the plaintext and the at least part of the initialisation vector to the processor.

Clause BC, A device as in clause BB, wherein the device is a subsystem for acting as a work accelerator to a host system coupled to the device, wherein the storage external to the processor is memory of the host system.

Clause BD, A device as in clause BC, wherein the processor is configured to receive from the host at least part of the computer readable instructions.

Clause BE, A device as in clause BB, wherein the processor is part of a multi-processor processing unit, wherein the device comprises a memory external to the processing unit, wherein the storage external to the processor is the memory external to the processing unit.

Clause BF, A device as in clause BE, wherein the memory external to the processing unit is a dynamic random access memory.

Clause BG, A device as in any of clauses BB to BF, wherein the processor is part of a multi-processor processing unit, wherein the processing unit comprises a further processor comprising a further at least one execution unit, the further at least one execution unit is configured to, prior to the issuance of the read request, execute computer readable instructions to cause issuance of at least one write request to write the plaintext to the storage external to the processor, the write request comprising the plaintext and at least part of the initialisation vector,
wherein circuitry of the at least one encryption unit is configured to: receive the at least one write request;
encrypt the plaintext of the write request using the initialisation vector to produce the ciphertext; and
cause the ciphertext and the initialisation vector to be written to the storage external to the processor.

Clause BH, A device as in clause BG, wherein the at least part of the initialisation vector consists of part of the initialisation vector, wherein the circuitry of the at least one encryption unit is configured to:
prior to encrypting the plaintext, complete the initialisation vector by updating a counter value and adding the updated counter value to the part of the initialisation vector.

Clause BI, A device as in any of clauses BB to BH, wherein the expected at
least part of the initialisation vector comprises at least one of:
an identifier of the processor;
a stream of data from which the read request is targeting to read from; and a block of data from which the read request is targeting to read from.

Clause BJ, A device as in any of clauses BB to BI, wherein the at least one read completion comprises a message authentication code, wherein the circuitry of the at least one encryption unit is configured to check that the message authentication code matches an expected message authentication code for the read requested data.

Clause BK, A device as in clause BA, wherein the device comprises at least one encryption unit comprising the processing circuitry, wherein the processing circuitry is configured to:
receive the encryption frame from a further device over a point to point communication link;

update a counter value stored in storage of the encryption unit, wherein the updated counter value is the expected at least part of the initialisation vector for the encryption frame;
in response to determining a match between the initialisation vector in the encryption frame and the expected at least part of the initialisation vector, decrypt the ciphertext to produce the plaintext using the initialisation vector in the encryption frame; and provide the plaintext and the at least part of the initialisation vector to the processor.

Clause BL, A device as in clause BK, wherein the point to point communication link comprises one of:
a peripheral component interconnect express link; and an Ethernet link.

Clause BM, A device as in clause BK or clause BL, wherein the processing circuitry is configured to following the decryption of the ciphertext:
receive a write request from the processor or a further processor of the device, the write request comprising a further plaintext;
update the counter value stored in storage of the encryption unit to provide a further updated value;
use the further updated value as an initialisation vector to encrypt the further plaintext to produce a further ciphertext; and
provide the further ciphertext along with the initialisation vector to the further device over the point to point communication link.

Clause BN, A data processing system as in clauses BK to BM, wherein the data processing system comprises the device and the further device,
wherein the further device comprises a further at least one encryption unit comprising a further processing circuitry, wherein the further processing circuitry is configured to: in response to receiving the plaintext from a further processor of the further device, update a further counter value stored in storage of the at least one encryption unit;
use the updated further counter value as the initialisation vector to encrypt the plaintext to produce the ciphertext, wherein the updated further counter value is equal to the updated counter value; and
provide the encryption frame to the device over the point to point communication link.

Clause BO, A device as in any of clauses BA to BN, wherein the device is an integrated circuit.

Clause BP, A device as in any of clauses BA to BO, wherein the decryption of the ciphertext using the initialisation vector is performed according to the advanced encryption standard.

Clause BQ, A device as in any of clauses BK to BP, wherein the encryption frame comprises a message authentication code, wherein the processing circuitry of the at least one encryption unit is
configured to check that the message authentication code matches an expected message authentication code for the plaintext.

Clause BR, A method for ensuring freshness of data, the method comprising:
determining an expected at least part of an initialisation vector for an encryption frame, the encryption frame comprising ciphertext and an initialisation vector used to generate the ciphertext;
comparing at least part of the initialisation vector of the encryption frame to the at least part of the expected initialisation vector; and in response to determining a match between the at least part of the initialisation vector in the encryption frame and the expected at least part of the initialisation vector, causing a plaintext generated by decrypting the ciphertext to be stored in a memory of a processor of the data processing system.

Clause BS, A computer program when executed by processing circuitry causes a method to be carried out, the method comprising:
determining an expected at least part of an initialisation vector for an encryption frame, the encryption frame comprising ciphertext and an initialisation vector used to generate the ciphertext;
comparing at least part of the initialisation vector of the encryption frame to the at least part of the expected initialisation vector; and
in response to determining a match between the at least part of the initialisation vector in the encryption frame and the expected at least part of the initialisation vector, causing a plaintext generated by decrypting the ciphertext to be stored in a memory of a processor of the data processing system.

Clause BT, A non-transitory computer readable medium comprising a computer program as in paragraph 22.

Alternatively or in addition to the other examples described herein, examples include any combination of the following:

Clause A. A processing system comprising: one or more chips, each comprising a plurality of tiles, each tile comprising a respective processing unit and memory storing a codelet;
at least one encryption unit configured to encrypt and decrypt data transferred between the tiles and a trusted computing entity via an external memory;
wherein the codelets have been compiled by a compiler at the trusted computing entity, to instruct the tiles to transfer the encrypted data by reading from and writing to a plurality of memory regions at the external memory such that a plurality of streams of encrypted data are formed, each stream using an individual one of the memory regions at the external memory.

Clause B The processing system of clause A wherein at least one of the tiles is an ingress tile configured to:
determine, using the codelet of the tile, an expected initialization vector of a next frame of one of the streams to be read;
issue a read request to read a next frame of the stream from the memory region associated with the stream;
responsive to the next frame arriving in local memory of the ingress tile, check that an initialization vector contained in the next frame matches the expected initialization vector; and
responsive to the match failing, generating a security exception; or
wherein at least one of the tiles is an egress tile configured to:
determine, using information about data to be written to the external memory, a size and initialization vector of a next frame of one of the streams being written from the processing system to the external memory;
write the initialization vector into a current frame of the stream;
issue a write request for the current frame, the write request being issued to the external memory region associated with the stream.

Clause C The processing system of clause A or clause B wherein at least one of the streams is a fixed layout stream for transferring the data by breaking the data up into frames in a fixed order.

Clause D The processing system of any preceding clause wherein at least one of the streams is a flexible layout stream which transfers the data by breaking the data up into frames in an order that can change and/or is dependent on an application which will use the transferred data.

Clause E The processing system of any preceding clause wherein each of the codelets has been compiled by the compiler according to a plurality of parameters determined by the compiler within specified constraints, wherein the parameters are selected from one or more of: a contiguous region of specified size in the external memory, which keys to load into encryption units at a plurality of specified points of execution where execution is temporarily halted until keys are loaded, a set of the tiles that will issue read or write requests to the external memory, for each tile: an index indicating a starting point, and a number of frames to read or write subsequent to the starting point.

Clause F The processing system of clause E wherein the constraints are selected from one or more of: a cumulative size of memory regions at the external memory allocated to live streams, a threshold amount of data that can be read or written from or to a stream.

Clause G The processing system of clause E wherein, for a given stream, the size of the memory region and the number of tiles in the set, are selected based on a frequency of use of the stream and an amount of data associated with a read or write request of the stream.

Clause H The processing system of clause E wherein data transferred in a stream is allocated between a plurality of tiles in the set in a round robin manner.

Clause I The processing system of any preceding clause wherein the encryption unit comprises a plurality of registers, and wherein the processing system comprises a secure microcontroller unit, SMCU, configured to receive a key manifest from the compiler and to use the key manifest to program the registers in order that the encryption unit operates to encrypt and decrypt the data of the streams.

Clause J The processing system of clause I wherein the SMCU is configured to receive the key manifest comprising metadata for at least one re-keying event, the metadata usable by the SMCU to re-program the registers of the encryption unit to reflect a new assignment of tiles and memory regions of the streams.

Clause K The processing system of any preceding clause wherein at least one of the streams is a secure checkpoint egress stream for writing model weights and metadata from the processing system to the external memory at a stage of training of the model referred to as a checkpoint, to enable training of the model to be restarted from the checkpoint, the metadata comprising an offset from which the data streams is to be resumed; and wherein at least one of the tiles is an egress tile of the secure checkpoint egress stream, the egress tile being configured to obtain an initial value of a checkpoint epoch counter and an initial value of a checkpoint identifier.

Clause L The processing system of clause K wherein the egress tile is configured to divide the model weights and metadata into frames and to generate and add an initialization vector to each frame, the initialization vectors being generated using the codelet and current values of the checkpoint epoch counter and checkpoint identifier, and wherein the egress tile is configured to increment the checkpoint identifier after writing the weights and metadata.

Clause M The processing system of any preceding clause wherein at least one of the streams is a secure checkpoint ingress stream for reading model weights and metadata from the external memory into the processing system, the metadata comprising a current offset of an ingress stream; and wherein at least one of the tiles is an ingress tile of the secure checkpoint ingress stream, the ingress tile being configured to: obtain an initial value of a checkpoint epoch counter and an initial value of a checkpoint identifier and to use the initial values of the checkpoint epoch counter and the checkpoint identifier to generate expected initialization vectors while reading the model weights and metadata, and to increment the checkpoint epoch counter and reset the checkpoint identifier after reading the model weights and metadata.

Clause N The processing system of any preceding clause wherein at least one of the streams is a secure checkpoint stream for reading or writing encrypted model weights and metadata, and wherein the SMCU is configured to provision two checkpointing keys, one for encrypting model weights and metadata to be written for a new training epoch and one for decrypting model weights and metadata to be read from a previous epoch, and wherein the secure checkpoint stream has an associated plaintext checkpoint stream comprising metadata in plaintext form Clause O The processing system of any preceding clause wherein the codelets are configured to instruct at least one of the tiles to read from a memory region of a first steam to obtain a first frame having a first initialization vector and to read from a second memory region, being a memory region of a permutation stream, to obtain a sequence number, and wherein the tile is configured to generate an expected initialization vector from the sequence number and a codelet of the tile, and to compare the expected initialization vector to the initialization vector of the first frame, and, responsive to the comparison finding a discrepancy, triggering an error process.

Clause P The processing system of clause O wherein the tile is configured to obtain the sequence number by reading a frame from the second memory region, generating an expected initialization vector and comparing the expected initialization vector and an initialization vector of the frame.

Clause Q The processing system of clause O or clause P wherein the memory region of the first stream and the memory region of the permutation stream are a single logical region of memory.

Clause R The processing system of any of clauses O to Q wherein the permutation stream contains only the sequence index of a first frame of each data instance of the stream and the codelet of the ingress tile knows how many frames there are per data instance.

Clause S A method performed at a processing system comprising one or more chips, each comprising a plurality of tiles, each tile comprising a respective processing unit and memory, the method comprising:
storing a codelet at each tile, each codelet having been compiled by a compiler at the trusted computing entity;
using at least one encryption unit to encrypt and decrypt data transferred between the tiles and a trusted computing entity via an external memory;
using the codelets to instruct the tiles to transfer the encrypted data by reading from and writing to a plurality of memory regions at the external memory such that a plurality of streams of encrypted data are formed, each stream using an individual one of the memory regions at the external memory.

Clause T A data center comprising:
a plurality of compute nodes, each compute node comprising at least one peripheral device, the peripheral device comprising:
a plurality of tiles, each tile comprising a respective processing unit and memory storing a codelet;
at least one encryption unit configured to encrypt and decrypt data transferred between the tiles and a trusted computing entity via an external memory;
wherein the codelets have been compiled by a compiler at the trusted computing entity to instruct the tiles to transfer the encrypted data by reading from and writing to a plurality of memory regions at the external memory such that a plurality of streams of encrypted data are formed, each stream using an individual one of the memory regions at the external memory.

The invention claimed is:
1. A processing system comprising:
a chip comprising a plurality of tiles, each tile comprising a respective processing unit and memory storing a codelet;
an encryption unit configured to encrypt and decrypt data transferred between the tiles and a trusted computing entity via an external memory;
wherein the codelets have been compiled by a compiler at the trusted computing entity to instruct one of the tiles to transfer the encrypted data by reading from and writing to a memory region at the external memory such that a stream of encrypted data is formed, the stream using the memory region at the external memory; and
wherein the encryption unit comprises a register, and wherein the processing system comprises a secure microcontroller unit (SMCU) configured to receive a key manifest from the compiler and to use the key manifest to program the register in order that the encryption unit operates to encrypt and decrypt the data of the stream.

2. The processing system of claim 1 wherein the one of the tiles is an ingress tile configured to:
determine, using the codelet of the tile, an expected initialization vector of a next frame of the stream to be read;
issue a read request to read a next frame of the stream from the memory region associated with the stream;
responsive to the next frame arriving in local memory of the ingress tile, check that an initialization vector contained in the next frame matches the expected initialization vector; and
responsive to the match failing, generating a security exception; or
wherein the one of the tiles is an egress tile configured to:
determine, using information about data to be written to the external memory, a size and initialization vector of a next frame of one of the streams being written from the processing system to the external memory;
write the initialization vector into a current frame of the stream; and
issue a write request for the current frame, the write request being issued to the memory region associated with the stream.

3. The processing system of claim 1 wherein the stream is a fixed layout stream for transferring the data by breaking the data up into frames in a fixed order.

4. The processing system of claim 1 wherein the stream is a flexible layout stream which transfers the data by breaking the data up into frames in an order that can change or is dependent on an application which will use the transferred data.

5. The processing system of claim 1 wherein one of the codelets has been compiled by the compiler according to a parameter determined by the compiler within a specified constraint, wherein the parameter is selected from one or more of: a contiguous region of specified size in the external memory, which key to load into the encryption unit at a specified point of execution where execution is temporarily halted until the key is keys are loaded, a set of the tiles comprising at least one tile that will issue read or write requests to the external memory, for each tile: an index indicating a starting point, and a number of frames to read or write subsequent to the starting point.

6. The processing system of claim 5 wherein the constraint is selected from one or more of: a cumulative size of the memory regions at the external memory allocated to a live stream, a threshold amount of data that can be read or written from or to the stream.

7. The processing system of claim 5 wherein, for the stream, the size of the memory region and a number of tiles in the set, are selected based on a frequency of use of the stream and an amount of data associated with a read or write request of the stream.

8. The processing system of claim 5 wherein the data transferred in the stream is allocated between a plurality of tiles in the set in a round robin manner.

9. The processing system of claim 1 wherein the key manifest comprises metadata for at least one re-keying event, the metadata being usable by the SMCU to re-program the register of the encryption unit to reflect a new assignment of a new tile and new memory region of the stream.

10. The processing system of claim 1 wherein:
the stream is a secure checkpoint egress stream for writing model weights and metadata from the processing system to the external memory at a stage of training of the model referred to as a checkpoint, the writing of the model weights and metadata enabling training of the model to be restarted from the checkpoint, the metadata comprising an offset from which the data streams will be resumed; and
the one of the tiles is an egress tile of the secure checkpoint egress stream, the egress tile being configured to obtain an initial value of a checkpoint epoch counter and an initial value of a checkpoint identifier.

11. The processing system of claim 10 wherein the egress tile is configured to divide the model weights and metadata into frames and to generate and add an initialization vector to each frame, the initialization vectors being generated using the codelet and current values of the checkpoint epoch counter and checkpoint identifier, and wherein the egress tile is configured to increment the checkpoint identifier after writing the weights and metadata.

12. The processing system of claim 1 wherein the stream is a secure checkpoint ingress stream for reading model weights and metadata from the external memory into the processing system, the metadata comprising a current offset of a confidential data stream; and wherein the one of the tiles is an ingress tile of the secure checkpoint ingress stream, the ingress tile being configured to: obtain an initial value of a checkpoint epoch counter and an initial value of a checkpoint identifier and to use the initial values of the checkpoint epoch counter and the checkpoint identifier to generate expected initialization vectors while reading the model weights and metadata, and to increment the checkpoint epoch counter and reset the checkpoint identifier after reading the model weights and metadata.

13. The processing system of claim 1 wherein the stream is a secure checkpoint stream for reading or writing encrypted model weights and metadata, and wherein the SMCU is configured to provision two checkpointing keys, one for encrypting model weights and metadata to be written for a new training epoch and one for decrypting model weights and metadata to be read from a previous epoch, and wherein the secure checkpoint stream has an associated plaintext checkpoint stream comprising metadata in plaintext form.

14. The processing system of claim 1 wherein one of the codelets is configured to instruct the one of the tiles to read from a memory region of a first stream to obtain a first frame having a first initialization vector and to read from a second memory region, the second memory region being a memory region of a permutation stream, to obtain a sequence number, and wherein the one of the tiles is configured to generate an expected initialization vector from the sequence number and the one of the codelets, and to compare the expected initialization vector to the initialization vector of the first frame, and, responsive to the comparison finding a discrepancy, triggering an error process.

15. The processing system of claim 14 wherein the one of the tiles is configured to obtain the sequence number by reading a frame from the second memory region, generating an expected initialization vector and comparing the expected initialization vector and an initialization vector of the frame from the second memory region.

16. The processing system of claim 14 wherein the memory region of the first stream and the memory region of the permutation stream are a single logical region of memory.

17. The processing system of claim 14 wherein the permutation stream contains only the sequence number of a first frame of each data instance of the stream and the codelet of the one of the tiles knows how many frames there are per data instance.

18. A method performed at a processing system comprising one or more chips, each comprising a plurality of tiles, each tile comprising a respective processing unit and memory, the method comprising:
storing a codelet at a tile of the plurality of tiles, the codelet having been compiled by a compiler at a trusted computing entity;
using an encryption unit to encrypt and decrypt data transferred between the tile and the trusted computing entity via an external memory;
using the codelet to instruct the tile to transfer encrypted data by reading from or writing to a memory region of the external memory such that a stream of encrypted data is formed, the stream using the memory region; and
wherein the encryption unit comprises a register, and wherein the processing system comprises a secure microcontroller unit configured to receive a key manifest from the compiler and to use the key manifest to program the register in order that the encryption unit operates to encrypt or decrypt the stream.

19. A data center comprising:
a compute node comprising a peripheral device, the peripheral device comprising:
a plurality of tiles, each tile comprising a respective processing unit and memory storing a codelet;

an encryption unit configured to encrypt and decrypt data transferred between the tiles and a trusted computing entity via an external memory;

wherein one of the codelets has been compiled by a compiler at the trusted computing entity to instruct one of the tiles to transfer the encrypted data by reading from or writing to a memory region at the external memory such that a stream of encrypted data is formed, the stream using the memory region at the external memory; and wherein the stream is a secure checkpoint stream for reading or writing encrypted model weights and metadata, and wherein a secure microcontroller unit is configured to provision two checkpointing keys, one for encrypting model weights and metadata to be written for a new training epoch and one for decrypting model weights and metadata to be read from a previous epoch, and wherein the secure checkpoint stream has an associated plaintext checkpoint stream comprising metadata in plaintext form.

* * * * *